United States Patent [19]

Eckel et al.

[11] Patent Number: 5,946,209
[45] Date of Patent: *Aug. 31, 1999

[54] MOTION SENSING SYSTEM WITH ADAPTIVE TIMING FOR CONTROLLING LIGHTING FIXTURES

[75] Inventors: David Philip Eckel, Wetherfield; Thomas James Batko, Wallingford; Mark Richard Walter, Bridgeport; William James Rose, West Hartford; Brian Patrick Donlon, Shelton; David Abraham Zeichner, Oxford, all of Conn.

[73] Assignee: Hubbell Incorporated, Orange, Conn.

[*] Notice: This patent is subject to a terminal disclaimer.

[21] Appl. No.: 08/823,154

[22] Filed: Mar. 25, 1997

Related U.S. Application Data

[63] Continuation of application No. 08/412,502, Mar. 29, 1995, Pat. No. 5,699,243, which is a continuation of application No. 08/382,691, Feb. 2, 1995, abandoned.

[51] Int. Cl.$^6$ ............................. G05B 11/01; H05B 37/02
[52] U.S. Cl. ......................... 364/143; 364/141; 364/146; 315/159
[58] Field of Search .................................... 364/143–146, 364/141, 140.05, 492, 493; 250/DIG. 1, 342, 214 AL, 221; 340/521, 522, 523, 528, 541, 565, 567, 600, 642; 315/360, 154, 156, 158, 159, 306, 307, 294; 307/116, 117; 362/802

[56] References Cited

U.S. PATENT DOCUMENTS

| | | | |
|---|---|---|---|
| 4,521,843 | 6/1985 | Pezzolo et al. | 364/145 |
| 4,575,659 | 3/1986 | Pezzolo et al. | 315/159 |
| 4,593,234 | 6/1986 | Yang | 315/360 |
| 4,636,774 | 1/1987 | Galvin et al. | 340/565 |
| 4,713,598 | 12/1987 | Smith | 323/245 |
| 4,769,765 | 9/1988 | Green | 364/145 |
| 4,874,962 | 10/1989 | Hermans | 307/116 |
| 5,128,654 | 7/1992 | Griffin et al. | 340/567 |
| 5,276,427 | 1/1994 | Peterson | 340/522 |
| 5,349,330 | 9/1994 | Diong et al. | 340/567 |
| 5,357,170 | 10/1994 | Luchaco et al. | 315/159 |
| 5,386,210 | 1/1995 | Lee | 340/567 |
| 5,406,176 | 4/1995 | Sugden | 315/360 |
| 5,473,202 | 12/1995 | Mudge et al. | 307/116 |
| 5,489,827 | 2/1996 | Xia | 315/294 |
| 5,640,143 | 6/1997 | Myron et al. | 340/541 |
| 5,699,243 | 12/1997 | Eckel et al. | 364/146 |
| 5,701,117 | 12/1997 | Platner et al. | 340/567 |

FOREIGN PATENT DOCUMENTS

| | | | |
|---|---|---|---|
| 006691 | 4/1982 | European Pat. Off. | G08B 13/16 |
| WO92/10074 | 6/1992 | WIPO | H05B 37/02 |
| WO93/05627 | 3/1993 | WIPO | H05B 37/02 |
| WO94/20937 | 9/1994 | WIPO | G08B 13/16 |

OTHER PUBLICATIONS

Product Brochure for Hubbell; H. Moss; Passive Infrared Wall Switch Sensor Models 1500A & 750A, 1993.

*Primary Examiner*—William Grant
*Assistant Examiner*—Steven R. Garland
*Attorney, Agent, or Firm*—Jerry M. Presson; Stacey J. Longanecker

[57] ABSTRACT

A system for selectively providing power from a power source to a load to operate in an area for at least one occupant comprising a processing device for controlling the opening and closing of a relay connected between the load and the power source for energizing the load, and a sensor for detecting the presence of an occupant in the area. The processing device is programmable to close the relay in response to an output signal from the sensor for a period of time that can be of fixed duration, or a duration that is dynamically and automatically determined using sensor data relating to measure time between successive, detected occupant movements. In addition to a daylight inhibit function, the system is provided with color indicators and a tone generator to indicate various operating conditions and to guide a user entering selected system parameters, among other features.

11 Claims, 21 Drawing Sheets

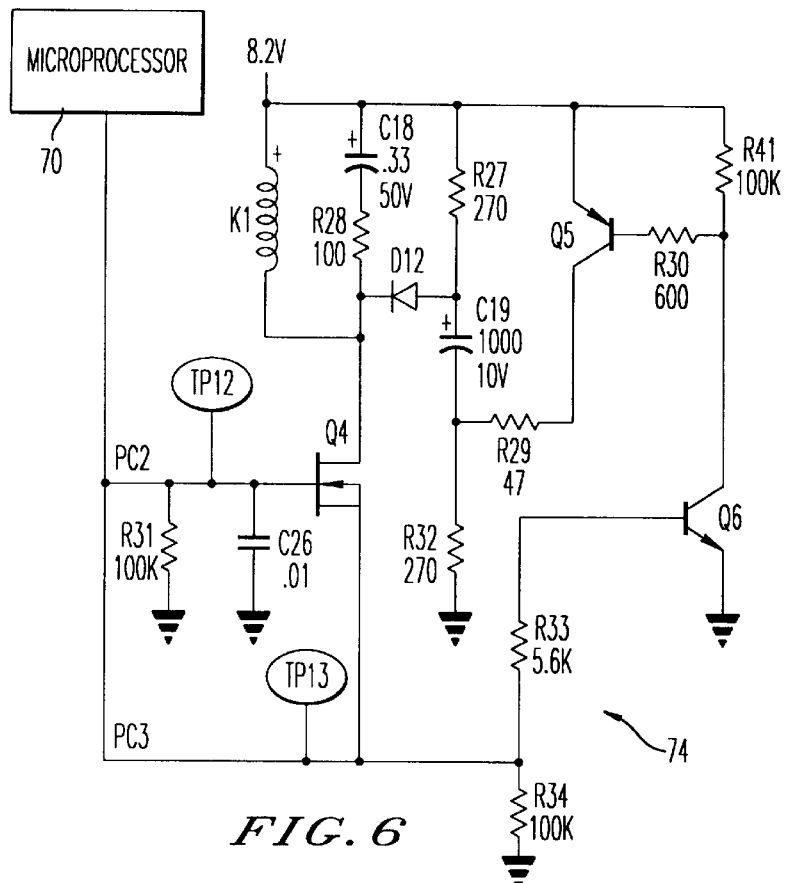
FIG. 6
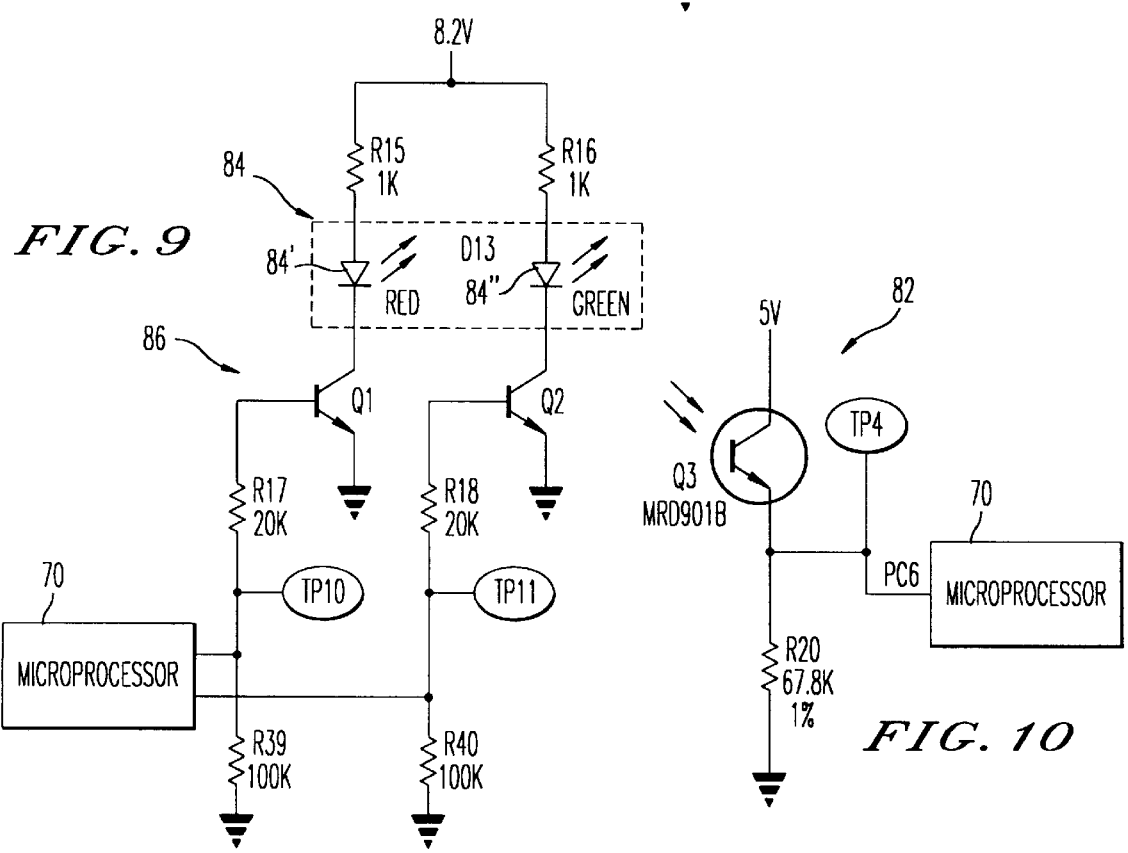
FIG. 9
FIG. 10

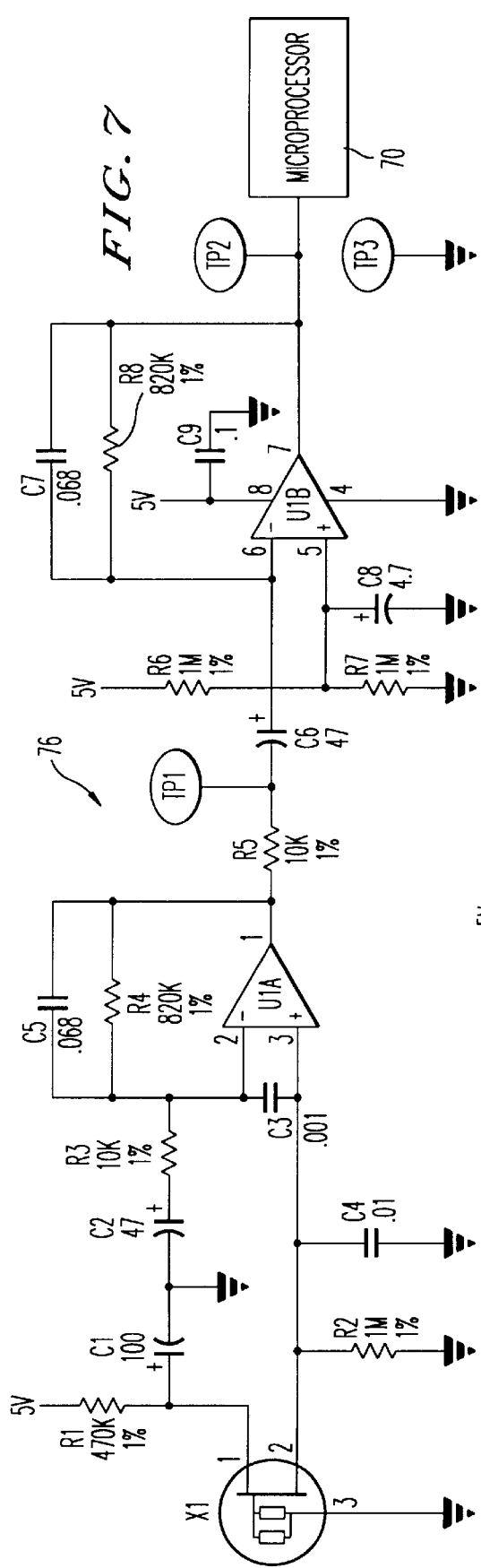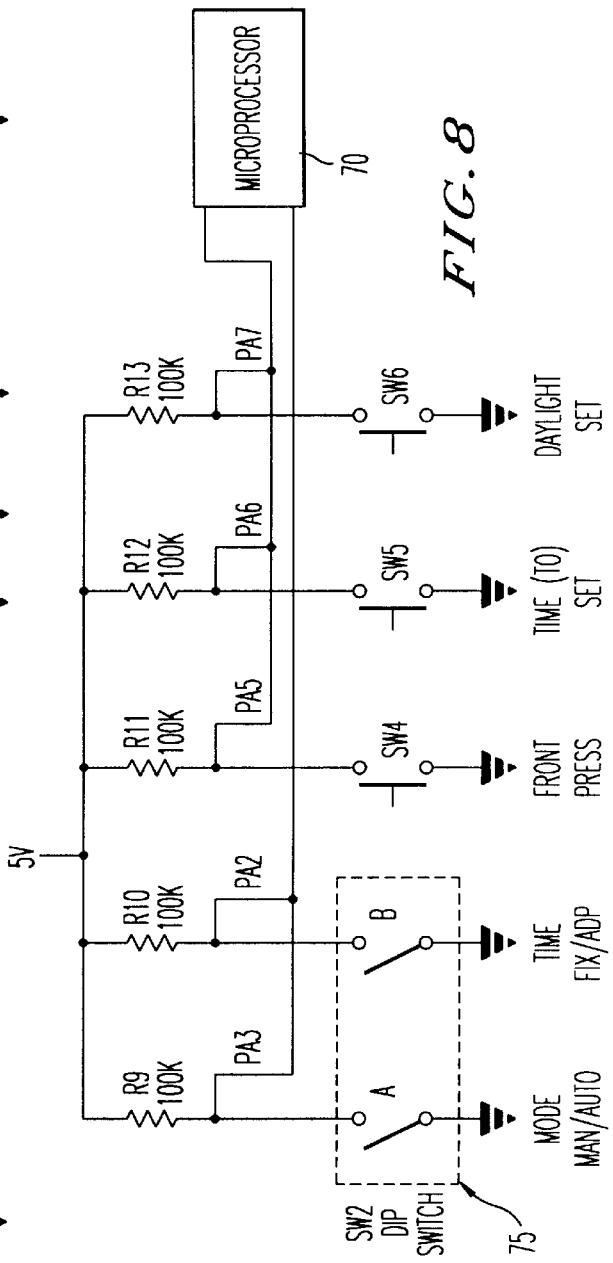
FIG. 7
FIG. 8

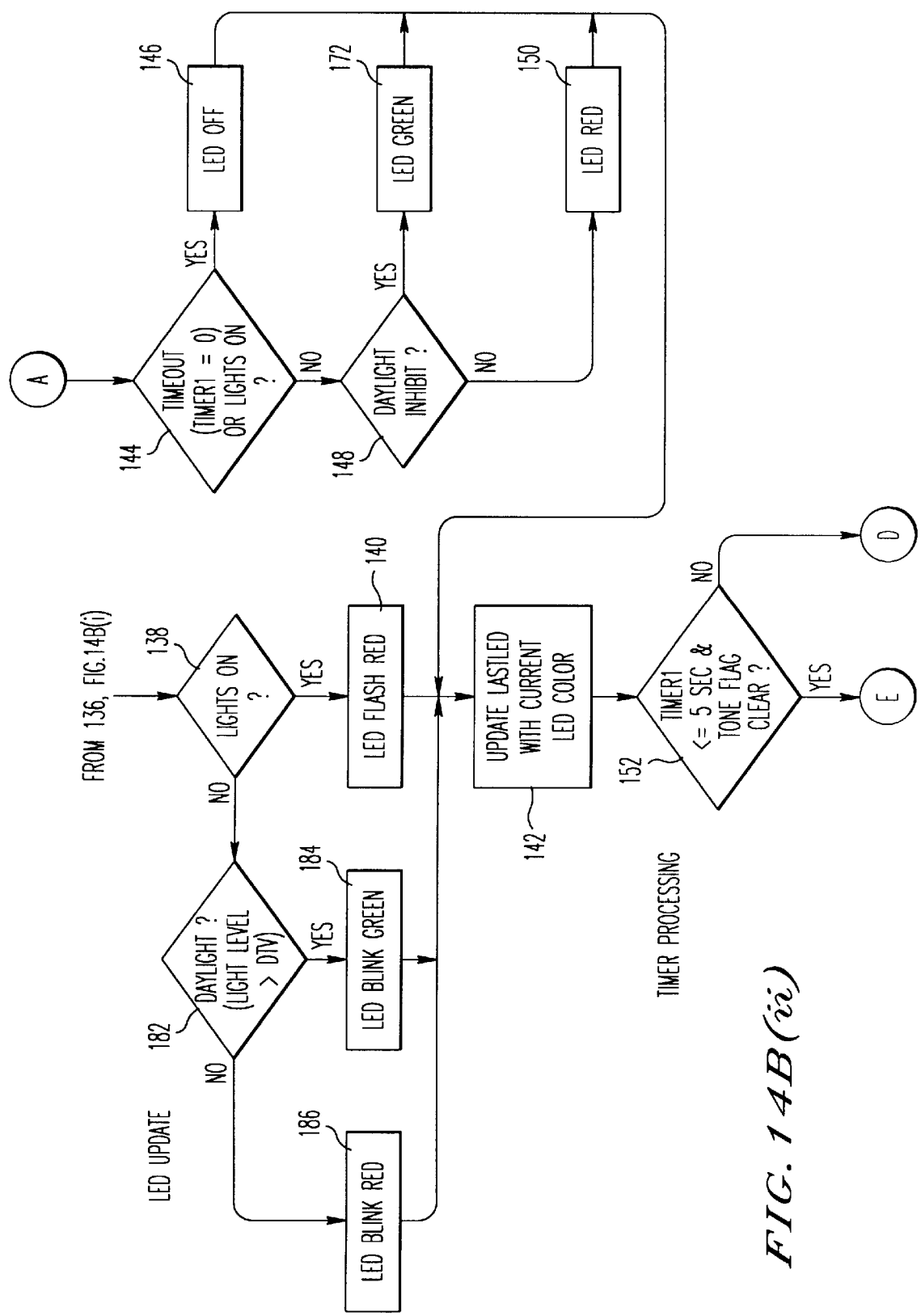
FIG. 14B(ii)

MOTION SENSING SYSTEM WITH ADAPTIVE TIMING FOR CONTROLLING LIGHTING FIXTURES

This application is a continuation of U.S. patent application Ser. No. 08/412,502, filed Mar. 29, 1995, now U.S. Pat. No. 5,699,243, which is a continuation of U.S. patent application Ser. No. 08/382,691, filed Feb. 2, 1995, now abandoned the entire subject matter of which is hereby incorporated herein by reference for all purposes.

FIELD OF THE INVENTION

The invention relates to a motion sensing apparatus for controlling lighting fixtures and, more particularly, to a motion sensing apparatus which automatically and dynamically increases or decreases the length of time lighting fixtures are powered up to accommodate occupants in the lighted area.

BACKGROUND OF THE INVENTION

Many commercial, industrial and government facilities require a significant number of lighting fixtures for adequate illumination, and therefore use a significant amount of power to operate the fixtures. To reduce power consumed to light these facilities, a number of facilities use lighting control systems which control when the lighting fixtures are energized. For example, a step-dimming system, such as the two-level lighting control system disclosed in U.S. Pat. No. 5,216,333 to Nuckolls, can be used to switch facility fixtures between energy-saving low level or reduced-wattage operation and full level or normal-wattage operation in accordance with output signals from a motion sensor. Step-dimming systems can respond to other conditions besides occupancy level such as ambient light level, time, and manual switching. U.S. Pat. No 4,713,598 to Smith discloses another device for controllably switching an AC line to energize a load. The device uses a passive infrared detector to sense motion.

Passive infrared wall switch sensors such as H-MOSS® motion switching system models 1500A and 750A, manufactured by Hubbell Incorporated of Bridgeport, Conn., can be used to automatically power up incandescent or fluorescent lighting fixtures upon detection of occupant motion, and to power down the fixtures after a predetermined period of time has elapsed following the last instance of detected motion. This period of time shall hereinafter be referred to as the time out (TO) period. These wall mounted switches provide adjustable TO periods, that is, the person installing the switch can specify the duration of the TO period by selecting and entering a numerical value corresponding to the desired duration of the TO period from a range of values. In addition, the 1500A model has a photocell device for controlling lighting fixtures in accordance with detected ambient light levels. In either model, the duration of the TO period remains fixed until it is manually adjusted by a person.

These lighting control devices are characterized by a number of drawbacks. For example, if the fixed TO period is too long, the wall switch does not realize maximum energy and cost savings. If the fixed TO period is too short, the wall switch powers down lighting fixtures while an occupant is still in the lighted area.

SUMMARY OF THE INVENTION

The present invention overcomes these drawbacks and realizes a number of advantages over existing controlled switching systems. In accordance with the present invention, a system for selectively providing power from a power source to a load is provided comprising:

a relay configured to provide a current conduction path between a power line and load (e.g., a lighting fixture) when in a closed position, and to interrupt the path when in an open position;

a processing device connected to the relay for controlling when the relay is in an open position and when the relay is in a closed position;

a memory device associated with said processing device for storing program code and parameters, one or more of which can be specified by a system user, the processing device being operable to control the relay in accordance with the program code and the parameter; and a sensor for detecting when an occupant has entered an area, which can be illuminated by the lighting fixtures, and providing an output signal to the processing device;

wherein the processing device is programmable to close the relay in response to the output signal for a period of time, the duration of which is determined automatically by the processing device.

In accordance with an aspect of the present invention, the switching system, which is hereinafter referred to as a lighting control system for illustrative purposes, operates in an adaptive timing mode whereby it automatically and dynamically adjusts the TO period according to the needs of occupants of a lighted area.

In accordance with another aspect of the invention, the lighting control system operates in a fixed timing mode which can be set by a user and which powers up lighting fixtures for a fixed TO period specified by the user. A switch is provided to configure the lighting control system to operate in either a fixed or an adaptive timing mode.

In accordance with another aspect of the present invention, the parameters need not be user-specified. The system is provided with default settings which are factory programmable and factory set.

In accordance with another aspect of the invention, a lighting control system comprises a switch which can be depressed by a user to select between manual and automatic modes of operation.

In accordance with another aspect of the invention, the lighting control system notifies the occupants of a lighted area via an audible tone of the impending power down of the lighting fixtures, giving the occupants the opportunity to respond by moving, e.g., changing an amount of energy measured by a detector or breaking an optical beam or creating a temperature differential that is detected. If the motion is detected, the lighting control system extends the TO period if the adaptive timing mode of operation is selected.

In accordance with still another aspect of the invention, the lighting control system comprises a processing device and a non-volatile memory device for storing a history of values corresponding to respective times between detected movements (TBMs) for calculating a decaying average of successive TBMs to adjust the TO period. Alternatively, the processing device can store an ongoing average in its random access memory.

In accordance with still another aspect of the invention, the lighting control system comprises a photocell sensor to override automatic power up of the lighting fixtures when ambient light level is sufficient. The desired ambient light level is entered by a user activating a switch on the housing of the lighting control system when the user regards the ambient light level in the area to be sufficient. The ambient light level at the time of switch activation is stored using a processing device and a memory device. The system does not require calibration to determine a numerically accurate ambient light level (e.g., number of foot-candles) for ambient light user-setting purposes.

In accordance with still another aspect of the invention, the lighting control system comprises a number of light emitting diodes (LEDs) to indicate a number of conditions such as when the switch has been set for daylight override, when the lighting fixtures are powered up, when motion is detected, when user data is being entered, and during data feedback.

Color, duty cycle, brightness, pulse width and operating frequency of the LEDs are used to indicate various conditions and information to a user. The LEDs can also provide data in a serial, coded mode to indicate unit operating serial number, software version number and failure modes.

In accordance with still another aspect of the invention, the lighting control system comprises an LED driver circuit which conserves current drawn by the LEDs. The driver circuit powers up the LED to a bright level and then reduces LED output using pulses that are imperceptible to the human eye. Pulsing can be accomplished in accordance with one embodiment of the invention by dynamically varying the duty cycle via a digital processing device or other switching device. In accordance with another embodiment of the invention, LED pulsing can be generated using an analog circuit to modulate a steady state output signal of a digital processing device or other switching device.

In accordance with still another aspect of the invention, the lighting control system is configured to detect zero-crossing of the lighting load circuit and comprises a processing device to coordinate delays associated with the relay and other circuit components with zero-crossing detection.

In accordance with another aspect of the invention, the lighting control system comprises a processing device for specifying whether the control system is operating in an intolerant mode or a tolerant mode. A tolerant mode of operation requires more detected motion data to trigger the power up of the fixtures. The lighting control system is therefore more immune to noise than during the intolerant mode of operation.

In accordance with another aspect of the invention, the processing device analyzes data, that is, light triggering events and time settings, to determine occupants' active and nonactive periods and adjusts the TO value accordingly.

In accordance with another aspect of the invention, the lighting control system is configured to receive signals from a data input device which downloads data such as a user-specified TO value and other set-up parameters.

In accordance with another aspect of the invention, an external data input device can be connected to the wall housing or set at the manufacturing facility to download a pass code authorizing the user to adjust Dual Inline Package (DIP) switch positions and/or depress momentary push buttons on the wall housing or lock-out the push buttons.

In accordance with still yet another aspect of the invention, the user can press selected buttons simultaneously or in certain predetermined sequence to enter a pass code in lieu of using an external data input device.

In accordance with another aspect of the invention, the setting switches for the lighting control system are readily available on a user-accessible surface of the wall mounted housing.

In accordance with another aspect of the invention, the lighting control system is contained in a wall mounted housing comprising terminals for connection to a power source in lieu of being provided with pig tails.

BRIEF DESCRIPTION OF THE DRAWINGS

These and other features and advantages of the present invention will be more readily apprehended from the following detailed description when read in connection with the appended drawings, which form a part of this original disclosure, and wherein:

FIGS. 5 through 10 and 16 are schematic circuit diagrams of the lighting control system constructed in accordance with an embodiment of the present invention;

DETAILED DESCRIPTION OF THE PREFERRED EMBODIMENTS

Figure 1:
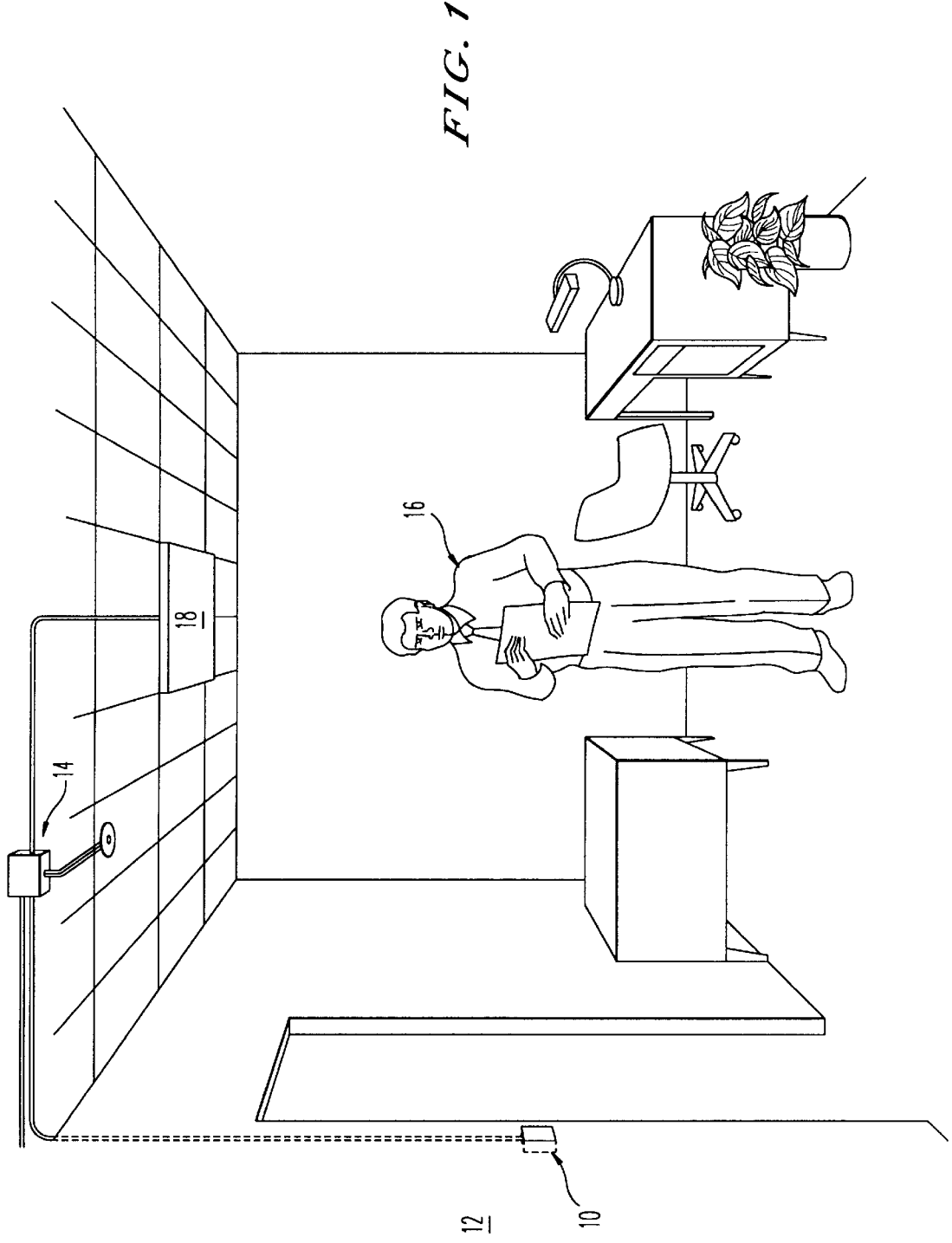
FIG. 1 is an overall view of a lighting control system mounted on a wall for controlling suspended lighting fixtures, and constructed in accordance with an embodiment of the present invention.

A switching system 10 constructed in accordance with the invention is shown in FIG. 1. The switching system 10 of the present invention is implemented with lighting fixtures for illustrative purposes and is therefore hereinafter referred to as a lighting control system 10. The control system, however, can be used with a number of different types of loads such as HVAC, security and temperature control systems. The lighting control system is secured to a wall 12 preferably 41 to 53 inches vertically from the floor. The height is selected to enable the motion sensor in the lighting control system to detect when an occupant 16 is walking in proximity of the sensor. As will be described below, the lighting control system controls the powering up and down of lighting fixtures 14 which are typically mounted overhead to a ceiling 18.

While the lighting control system 10 is shown in FIG. 1 secured to a wall in a room with ceiling-mounted lighting fixtures, the system 10 can be installed in outdoor areas, as well as indoor areas, for use with or without overhead lighting fixtures (e.g., floor lamps can be used). Further, it can be mounted on various surfaces such as the ceiling or on a vertical support or an angled wedge and at various heights to detect, for example, persons sitting in or walking about the lighted area. The term "lighted area" defines the area served by the lighting fixtures controlled by a lighting control system 10, and does not necessarily imply that the fixtures are powered up.

Figure 2:
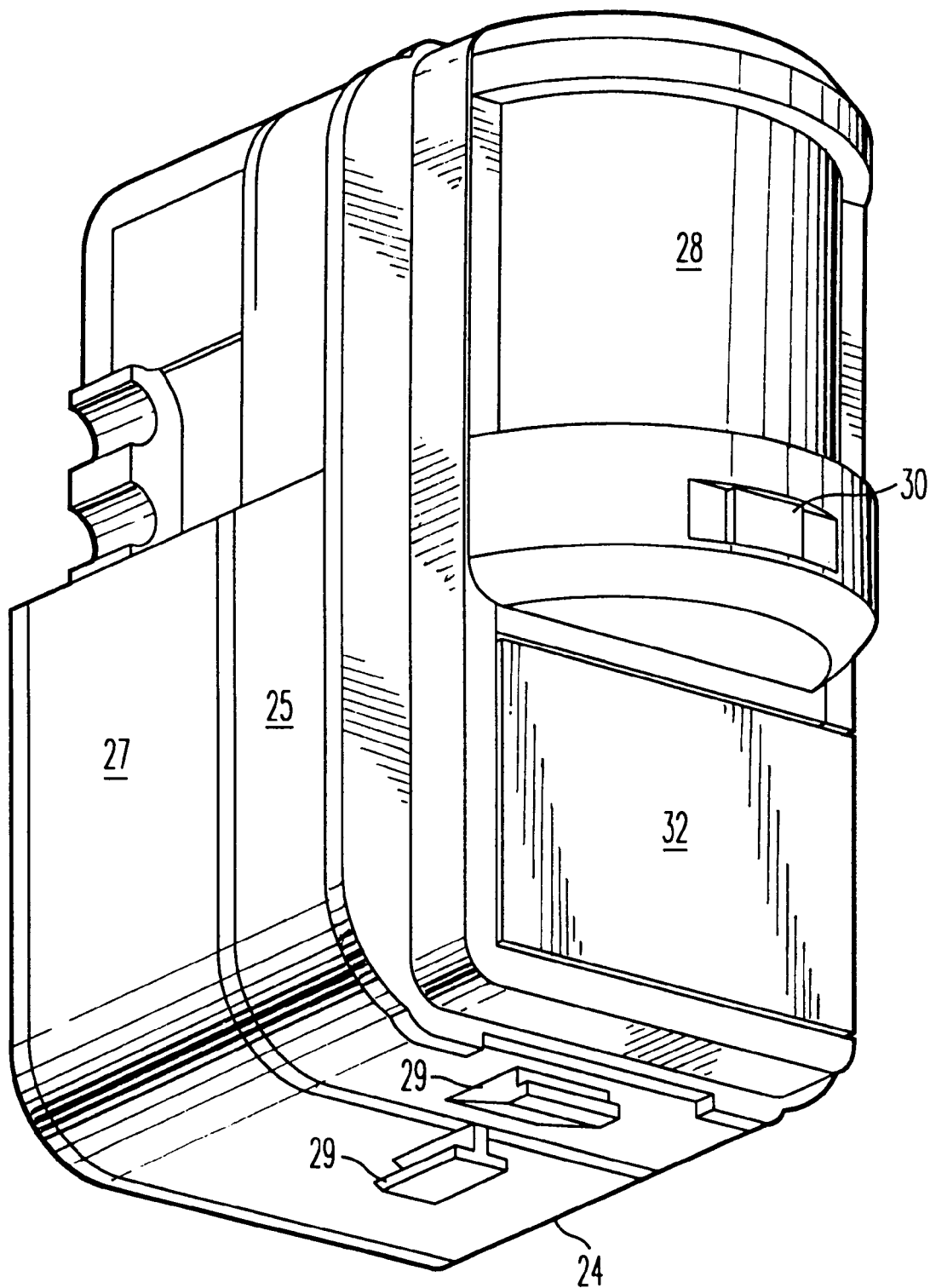
FIG. 2 is a perspective view of the front and back sections of a wall housing constructed in accordance with an embodiment of the present invention to contain the lighting control system.
Figure 3:
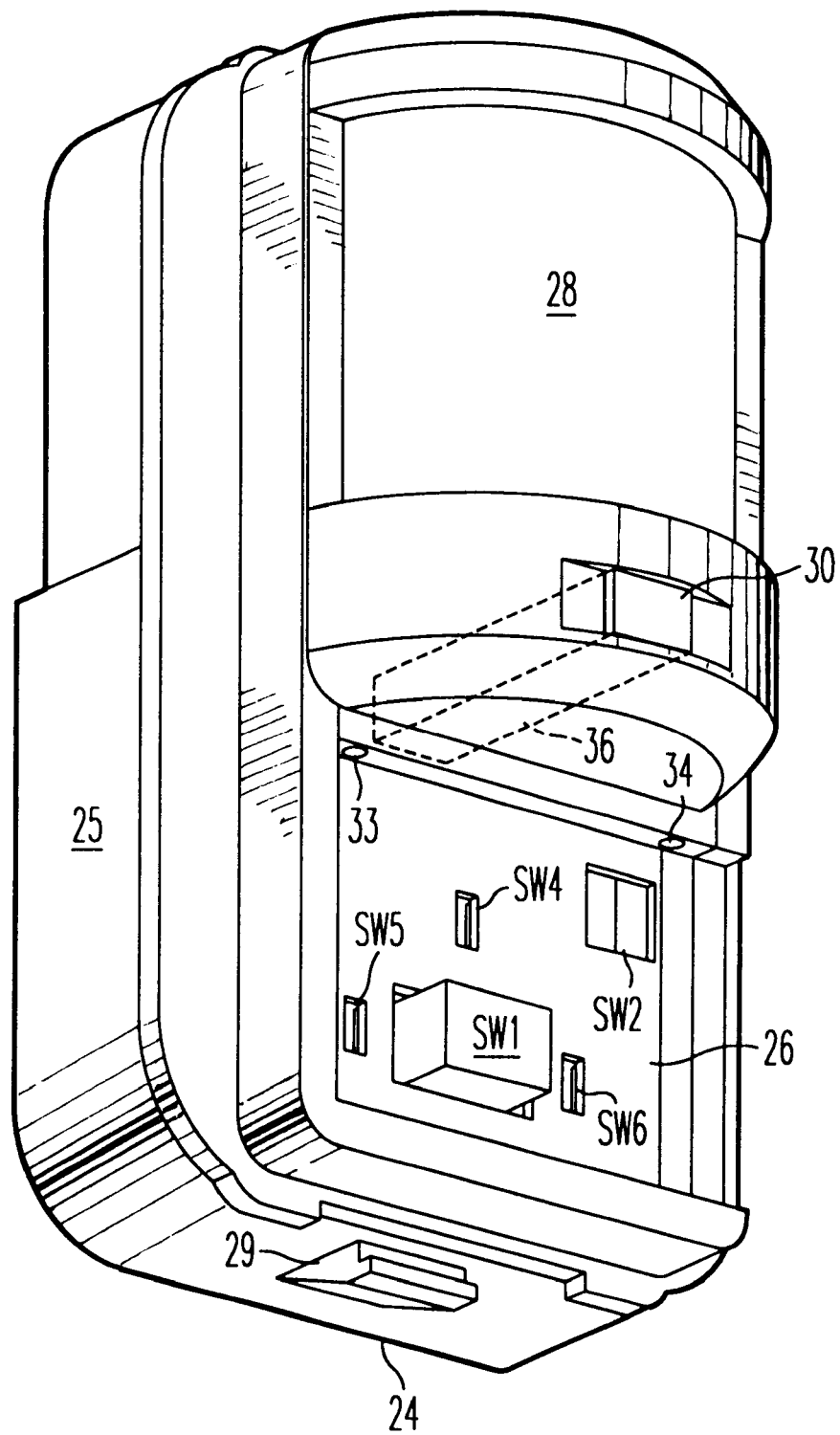
FIG. 3 is a perspective view of the front section of the wall housing depicted in FIG. 2.

With reference to FIG. 2, the lighting control system 10 is preferably contained in a rectangular housing 24 which protrudes from the wall 12 as shown in FIG. 1. The housing can be, for example, molded from a paintable copolymer material (e.g., an acrylonitrile butadiene styrene (ABS) copolymer) or a nylon material. The housing comprises a front portion 25 and a back portion 27 which are preferably detachably secured to each other using a bracket that is snap-fitted to protruding, plastic molded members 29 on the exterior surface of the housing. The housing 24 preferably comprises a Style Line-type housing which has been modified to comprise a different push button plate 26. The push button plate 26 is obscured from view in FIG. 2 by a hinged door 32. The push button plate 26 is shown in FIG. 3 wherein the door 32 has been removed to provide a better view of the plate 26. The door can be secured to the front portion 25 of the housing 24 so as to be hinged in a conventional manner such as by providing the door with two plastic molded, articulated members that are received in corresponding recesses 33 and 34.

With continued reference to FIGS. 2 and 3, the housing 24 comprises an aperture 28 in the top portion 25 thereof to accommodate the lens of a motion sensor and a photocell therein. An aperture 30 is also provided on the housing to accommodate at least one light emitting diode (LED) via a light pipe 36. The light pipe can be secured within the housing 24 using glue, or snap-fit in the housing or on the PCB. The push button plate 26 comprises apertures to accommodate a Front Press switch SW6, a DIP switch SW2, a TO set switch SW5, a daylight set switch SW6, and an air-gap ON/OFF switch SW1, which are described in further detail below. In accordance with an embodiment of the invention, the hinged door can be substituted for and function as a Front Press switch SW6. The system 10 is advantageous because it provides users with access to the buttons and set switches on the push button plate 26 on the front portion 25 of the housing 24. Users are not required to remove the cover of the housing or to use a tool (e.g., a screwdriver) in order to configure the system 10 via the buttons and set switches. Further, a printed set of instructions for using the buttons and set switches can be provided, for example, on the hinged door.

Figure 4:
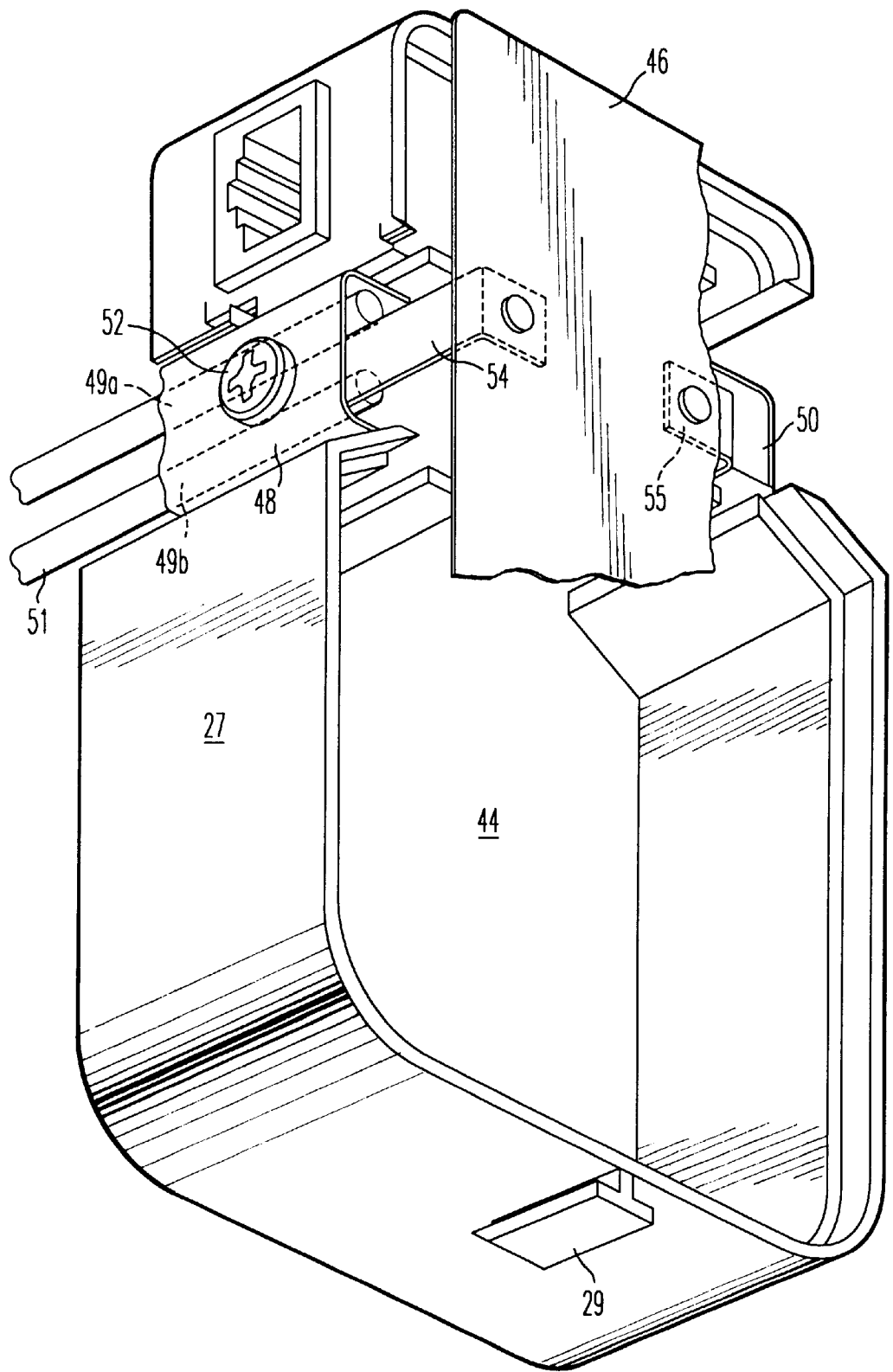
FIG. 4 is a perspective view of the back section of the wall housing depicted in FIG. 2.
Figure 16:
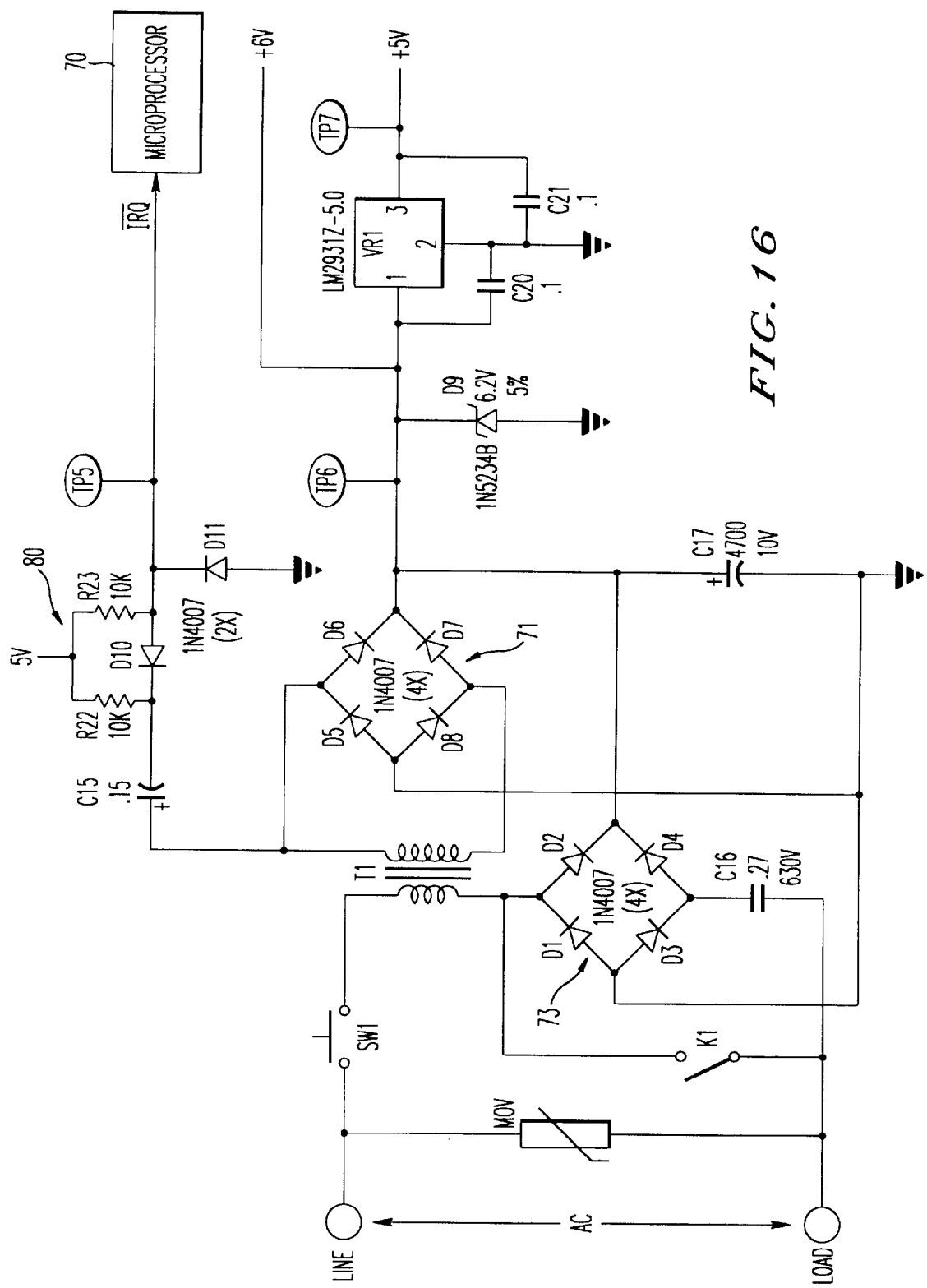

FIG. 4 depicts the bottom portion 27 of the housing 24 with the top portion 25 of the housing 24 (shown in FIG. 3) removed. The bottom portion of the housing comprises a recess 44 for accommodating a printed circuit board (PCB) 46. In accordance with an embodiment of the invention, the PCB 46 is secured in the front portion 25 of the housing using shelf members on the inside wall of the front portion 25. The PCB is described in more detail in connection with FIGS. 20 and 21. The bottom portion 27 of the housing also comprises two sets of screw terminals 48 and 50, which are essentially identical. Each set of the screw terminals comprises two or three recesses (e.g., recesses 49a and 49b indicated in broken lines on terminal 48) for accommodating, for example, a line wire, a neutral or common wire, and a ground wire, if any, extending from a lighting fixture, or from an AC power supply for the lighting fixture, to the lighting control system 10. Each recess (e.g., recess 49b) is configured to receive an individual wire (e.g., wire 51). A screw 52 is provided in each terminal to make electrical contact via conductive members 54 and 55 between the wires in the screw terminals 48 and 50, respectively, and a slide switch SW1, a transformer T1, a bridge rectifier circuit 73, a metal-oxide varistor (MOV), a relay K1 and a capacitor C1 on the PCB 46, which are shown in FIG. 16, when the screw is tightened. A jack 56 is provided as an interface between the lighting control system 10 and an external device described below.

The housing 24 is advantageous to use over existing wall-mounted switching devices or wall boxes which do not have terminals, but rather apertures for accepting power lines in the housing thereof. The power lines are typically connected to pig tails in the housing 24 using wire nuts. The pig tails and the wire nuts use considerable space within the wall box. Thus, a number of wall-mounted switches are too deep for use in a wall recess adapted for a conventional gang box. The terminal sets 48 and 50 eliminate the need to use wire nuts inside the wall box.

Figure 5:
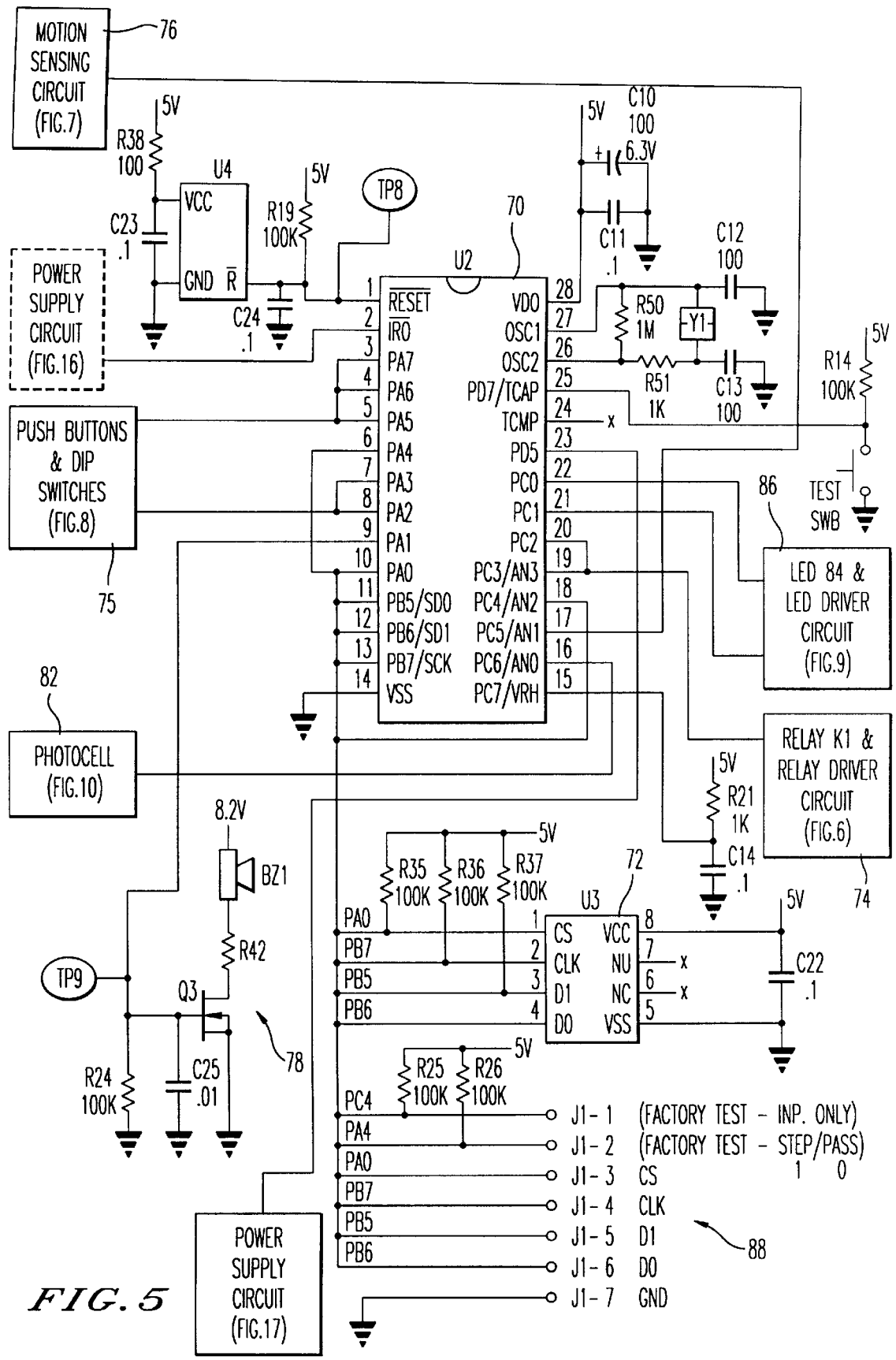
Figure 17:
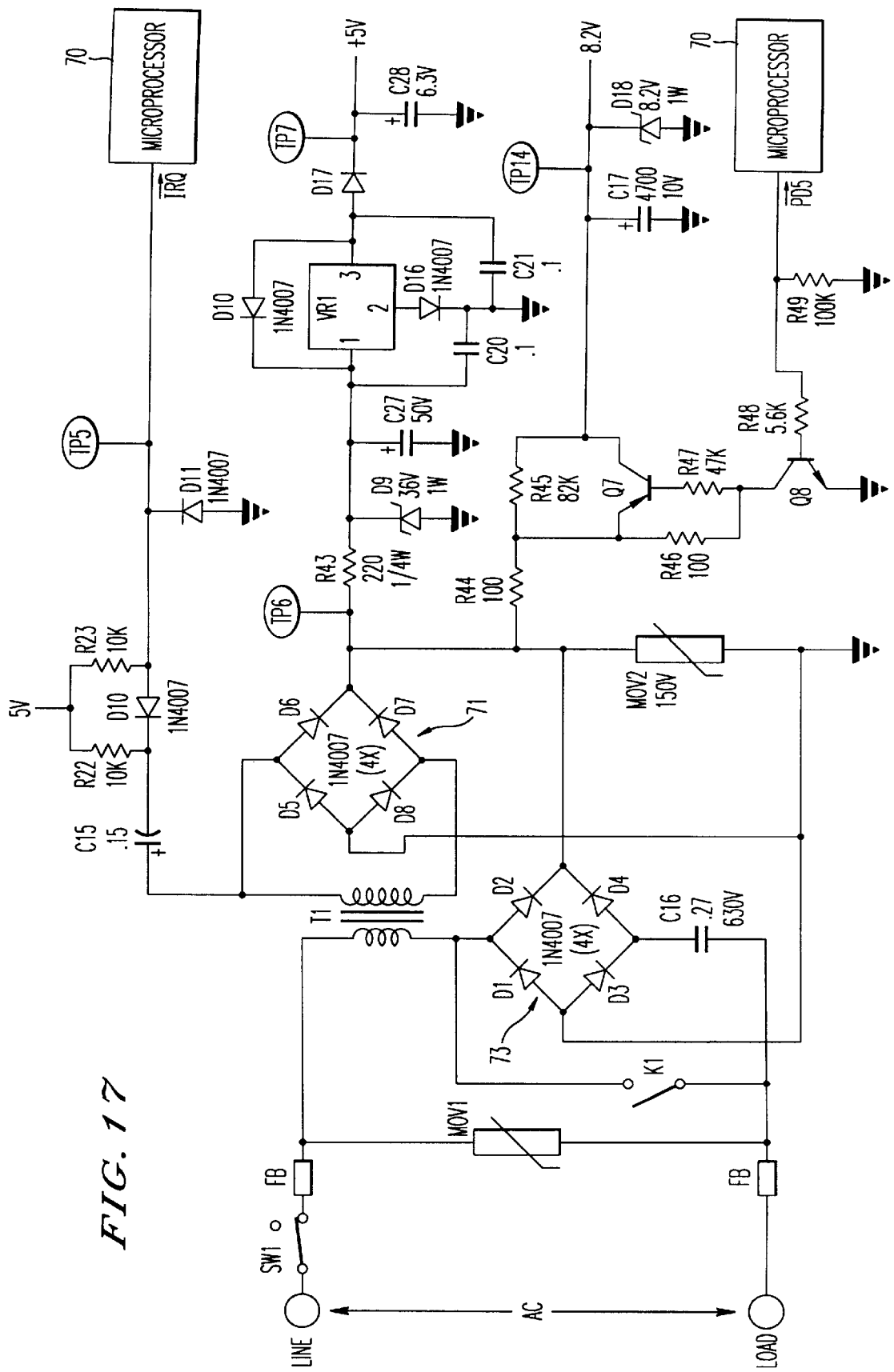
FIG. 17 is a power supply circuit constructed in accordance with another embodiment of the present invention.

With reference to FIG. 5, the lighting control system 10 comprises the following circuit components which are mounted in a conventional manner on the printed circuit board 46 secured inside the housing 24: (1) a microprocessor 70 and an associated memory device such as an electrically erasable programmable read-only memory (EEPROM) 72; (2) with reference to FIGS. 16 or 17, a transformer T1 and bridge rectifier circuits 71 and 73 for converting AC power preferably from a 120 or 277 volt AC (VAC) power source used to power up the lighting fixtures into a DC input power signal, e.g., 6.5 volt, 9 milliamp DC signal; (3) a voltage regulator VR1 (FIGS. 16 or 17) for supplying a 5 VDC signal to the microprocessor and other circuit components requiring a regulated voltage signal; (4) a relay K1 and relay driver circuit 74 (FIG. 6) for selectively supplying power to the lighting fixtures 14 via the AC power lines in response to an output signal from the microprocessor; (5) a motion sensing circuit 76 (FIG. 7); (6) a number of momentary push buttons and fixed, open or closed DIP switches indicated generally at 75 (FIG. 8); (7) a buzzer BZ1 and buzzer driver circuit 78; (8) a zero-crossing detection circuit 80 (FIGS. 16 or 17); (9) a photocell 82 (FIG. 10) for detecting ambient light levels; (10) LEDs 84 (FIG. 9); (11) an LED driver circuit 86; and (12) an external input device interface 88. In accordance with other embodiments of the invention, a power supply circuit as shown in FIG. 17 can be used in lieu of the power supply circuit in FIG. 16. Further, LED driven circuits described in connection with FIGS. 11, 12 and 13 can be used in lieu of circuit 86 (FIG. 9).

The microprocessor 70 is preferably a microcontroller chip model no. MC68HC05P6DW manufactured by Motorola Inc. of Schaumburg, Ill. The EEPROM 72 is preferably an integrated circuit model no. 93LC46/SN manufactured by Microchip Technology Inc. of Chandler, Ariz. The microprocessor is programmed in accordance with program code stored the read-only-memory (ROM) and random access memory (RAM) on the microprocessor chip and utilizes off-set values in the EEPROM. The program code is described in more detail below in connection with the flow charts depicted in FIGS. 14 and 15. A number of parameters are defined herein which can be changed in the program code without departing from the scope of the invention. These parameters include but are not limited to: (1) an adjustable TO value, hereinafter referred to as the motion sensor time out value (MTV), which is determined by the microprocessor to be a value preferably between 1 and 30 minutes; (2) a default TO value which is set to 15 minutes; (3) a fixed TO value which is selected by a user and is typically a value between 1 and 30 minutes; and (4) a special TO value which is also selected by a user, and is a value between 0 and 60 minutes or infinity.

As described above in connection with FIG. 3, an air-gap slide switch SW1 is provided as an ON/OFF switch to supply power to the system 10 from a preferably 120 or 277 volt AC power source (not shown) whenever a user places the switch SW1 in the ON position. Other types of power sources can be employed. Further, other types of switches can be used for the ON/OFF switch such as a soft OFF switch implemented using a microprocessor-controlled electromechanical switch. The air-gap switch is preferred for safety reasons. Relay K1 (e.g., model no. RP3SLA06 manufactured by Schrack Components, Inc. of Ft. Lauderdale, Fla.) is controlled by the microprocessor 70 to selectively supply power signals to the lighting fixtures from the 120 or 277 VAC power source. The coil of relay K1 is depicted in FIG. 6. The contact of relay K1 is shown in FIG. 16 and in FIG. 17.

The motion sensing circuit 76 (FIG. 7) preferably comprises a passive infrared (PIR) type sensor such as the pyro sensor model no. RE03HBBEC manufactured by Nippon Ceramic Co., Ltd. of Japan, which measures electromagnetic radiation in the range of 8 to 14 microns. The pyro sensor is connected to an amplifier such as a dual op-amp circuit model no. TLC27L2CD manufactured by Texas Instruments Inc. of Dallas, Tex. The lens is preferably a model no. WSS1200 lens from Bryant Electric, Inc. of Milford, Conn. Whereas the Bryant lens unit typically outputs a signal indicating detected motion whenever measured PIR is outside a ±0.5 volt threshold, the microprocessor is preferably programmed to operate the relay K1 when a transition has occurred from the inside to the outside of the ±0.5 volt threshold. The motion sensing circuit has a total field of view of approximately 170 degrees, and an adjustable coverage depth between 20 and 40 feet for an occupant walking through a 670 to 6700 square foot area, and between 13 and 32 feet for an occupant working in a 280 to 800 square foot area. Presence of an occupant can be detected using a number of different techniques such as measuring changes in the amount of energy measured by a detector, detecting the breaking of an optical beam or a temperature differential.

The various momentary press buttons (MPB) and DIP switches on the push button plate 26 will now be described in connection with FIG. 8. The lighting control system comprises two position DIP switch SW2 (e.g., model no. DS02 manufactured by Mors Components, Inc., Wakefield, Mass. which allows the user to configure the system to operate in either a fixed timing or an adaptive timing mode. In addition to the selecting fixed or adaptive timing mode, the DIP switch SW2 also allows a user to select between manual and automatic operation modes, which are described below. Two separate switches can also be used, or the microprocessor can set them automatically. If the DIP switch SW2 is set for the fixed timing mode, the microprocessor 70 controls the relay K1 to power up the lighting fixtures for a predetermined amount of time of fixed duration in response to detected motion. In contrast, if the DIP switch SW2 is set for the adaptive timing mode, the microprocessor controls the relay K1 to power up the lighting fixtures for an amount of time which is the same as or greater than a user-selected, programmed TO value, hereinafter referred to as the user-set TO value or UST. The microprocessor is programmed to analyze preprogrammed time settings and occurrences of detected motion in a room and to automatically calculate an adjusted UST value to coincide as closely as possible with actual room use. The adjusted UST value is preferably never less than the UST, and is also referred to as the motion TO value (MTV).

The user enters the desired UST into the lighting control system using a MPB-type TO set switch SW5 (FIG. 8) and a red LED 84' and green LED 84" (FIG. 9), and the buzzer 78, which are described below. If the user does not enter a selected TO value, the UST value defaults to 15 minutes, as stated previously. The lighting control system 10 therefore powers up lighting fixtures 14 in response to detected motion for 15 minutes unless the TO value is increased by the microprocessor 70 while in the adaptive timing mode, or is set manually to a different value.

The microprocessor 70 is programmed to accept input signals generated when the TO set switch SW5 is depressed. The input signals indicate how many times the TO set switch is depressed and for how long it is held in a depressed position by the user. To enter a UST value, the user depresses the TO set switch SW5 once, and holds the TO set switch in the depressed position between 3 and 6 seconds. The microprocessor 70 responds by driving the buzzer BZ1 (FIG. 5) to generate a double tone. The microprocessor also drives the red and green LEDs 84' and 84" so that the light pipe 36 appears to radiate an amber color. The user then depresses the TO set switch SW5 once for each minute of the selected TO duration. The tone is generated, and the LEDs which illuminate the light pipe are toggled, each time the TO set switch is depressed. If the TO set switch is not depressed again for 2 seconds after the last press, the last tone is generated. Further, the amber light pipe is flashed. The new UST corresponding to the number of presses is stored in the EEPROM 72. The MTV is reset to a zero value if the lighting control system 10 is operating in the adaptive timing mode. Finally, the MTV history is cleared.

If the TO set switch SW5 (FIG. 8) is depressed once and held for less than 3 seconds and released, the microprocessor 70 drives the buzzer BZ1 to generate a single tone. The microprocessor also drives the LEDs to flash the light pipe amber one time for every minute of the current stored UST or MTV value, depending on whether the lighting control system 10 is operating in the fixed or adaptive timing mode. If the TO set switch is depressed once and held for greater than 6 seconds before its release, the microprocessor 70 drives the buzzer BZ1 to generate a double tone after 3 seconds have elapsed, drives the light pipe to flash an amber color, and then drives the buzzer to generate a triple tone after 6 seconds have elapsed. The microprocessor subsequently resets the UST and the MTV to 15 minutes and stores the value in memory. During the setting modes, tones are preferably not generated upon release of the TO set switch, but rather when the time delay of 3 or 6 seconds is exceeded. The tone is an indication to the user that he or she has entered a certain mode and can, accordingly, release the TO set switch to select that mode without the aid of a stopwatch. Further, tones are generated to confirm that setting changes have been received, stored, and are ready to be used.

The lighting control system 10 can be configured to set the default to other values besides the 15 minute TO value using, for example, a non-masked component or programmable memory device on the PCB 46 that is loaded during manufacturing, or by downloading parameter values to the EEPROM 72 using an external input data device as described below. Further, a non-volatile memory (NVM) device can be used to store different default values in order to preset a parameter at the factory. For example, a parameter stored in the NVM can be an offset value that is added to a default value stored in microprocessor ROM.

In addition to a solid-colored, flashing or toggled amber light pipe, the red and green LEDs 84' and 84" (FIG. 9) themselves are also driven by the microprocessor 70 in solid, flashing or toggled illumination modes. The LEDs are configured such that only one color (e.g., green, red or amber) radiates from aperture 30 (FIG. 2). Alternatively, LEDs can be arranged such that two or more colors can appear on the push button plate 26 at one time. The red LED 84' is operated in a solid illumination mode when the lighting fixtures are powered down, and the lighting control system is not in the daylight inhibit mode. The red LED is toggled off when motion is detected. The green LED 84" is driven in a solid illumination mode when the lighting fixtures are powered down and then toggled when motion is detected to indicate that the lighting control system is in the daylight inhibit mode. Thus, the red and green LEDs together with the light pipe 36 provide feedback to the occupant regarding the lighting control system's functional state, and aid remotely located customer service personnel when helping an occupant identify which mode the system is in and whether or not it is malfunctioning (e.g., whether there is no input power, the system 10 is in the test mode, the TO value is too low, or the daylight threshold value is too low). For example, when the lighting fixtures are powered down, an illuminated green LED 84" provides a visible indication that the lighting control system is operational, but in a daylight inhibit mode. Occupants can therefore discern that the lighting control system is not malfunctioning when energized lighting fixtures are desired, but rather is simply not functioning because the daylight threshold level is set below the current ambient light level.

An interactive daylight set switch SW6 (FIG. 8) is provided to select whether or not daylight override is desired and for entering the desired ambient light level, above which the lighting fixtures are not to be powered up. The photocell 82 used for ambient light detection is preferably a phototransistor model no. MRD901B manufactured by Motorola. The user sets an ambient light setting within a range of preferably 25 foot-candles (ft-cd) and 300 ft-cd. The photocell 82 provides output signals to the microprocessor 70. The microprocessor compares the detected ambient light levels with the stored, desired ambient light level. The lighting fixtures are not powered up in response to detected motion if the stored, desired ambient light level is lower than the detected ambient light level. While the room is occupied and the lighting fixtures are powered on, the photocell does not power down the lighting fixtures, even if the detected ambient light is less than the user's setting. Further, the photocell does not affect the duration of TO.

As will be described below, the stored ambient light level selected by the user is adjustable between preferably a range of 25 and 300 ft-cd in 1 to 3 ft-cd increments within an overall possible range of 1 and an infinite number of ft-cd. The user begins to enter or change the stored value when the user believes the ambient light level in the room is sufficient. Thus, the lighting fixtures may or may not be powered down at the time of setting. When the daylight set button is activated to set the ambient light level, the lighting fixtures are preferably powered down automatically. If the lighting fixtures are on beforehand, they remain on during the photocell reading as well. Thus, the total ft-cd reading is now the ambient light level plus the system 10 light level. With this alternative method, it is not necessary to power down the lighting fixtures before taking a daylight level reading. The user setting shall hereinafter be referred to as the current daylight setting (CDS). If the ambient light level detected by the photocell 82 is greater than the CDS, the lighting fixtures remain powered down if they are already powered down.

The microprocessor drives the LEDs to flash the light pipe an amber color several times and generates a corresponding number of tones via the buzzer BZ1 when setting the ambient light level. The frequency with which the LEDs flash and the tones are generated increases just prior to the first photocell reading to notify the user to step away from the housing 24; otherwise, the user may cast a shadow on it. The microprocessor 70 is configured to receive a photocell reading, i.e., a measured value in units ft-cd, approximately every 20 milliseconds for a predetermined period of time. A history of measured ambient light level values is stored in the EEPROM 72. A measured ambient final value is calculated, preferably by determining the average of the history of values. The number of values in the history depends on the availability of memory space and the accuracy of the values. When memory space allocated for storing a history of measured values is exceeded, the stored values are overwritten on a first-in-first-out (FIFO) basis. When the lighting control system is powered down, the factory default setting and the CDS are stored in the EEPROM 72. The factory default setting is preferably with the daylight inhibit function disabled. The microprocessor is also programmed to calculate and store an active setting for the CDS value, which is determined to be the CDS value minus an offset of preferably 15 ft-cd. The active CDS value is used immediately after setting the photocell as described below.

The daylight set switch SW6 (FIG. 8) is preferably a MPB-type switch. To enter a CDS value, which corresponds to the current, desired level of ambient light in the room, the user depresses the daylight set switch and holds it for more than 3 seconds but less than 6 seconds before releasing it. As described above in connection with the TO set switch, the microprocessor 70 is programmed to drive the buzzer BZ1 to generate two tones. The LEDs are driven such that the light pipe appears to illuminate a flashing amber color.

The microprocessor is programmed to enter an ambient light level measurement stage for approximately 30 seconds whereby photocell readings are averaged and stored, commencing approximately 10 seconds after the daylight set switch is release. The 30 second and 10 second time durations are variables stored in memory which can be set to other time values and can be negative relative to the daylight set button. Every 0.5 seconds during the measurement stage, the buzzer tones for approximately 0.1 seconds, and the light pipe flashes for approximately 0.1 seconds. These tow events preferably occur synchronously with respect to each other. To do so, and to conserve power, the tone is generated and then the LED is flashed because sound travels slower than light. They therefore appear to occur synchronously.

The readings are stored as a history of values. The average of these historical values, that is, the measured ambient light level final value, or the average of the ambient light measured is calculated and stored as the CDS. The LED 84" is subsequently driven solid green to indicate that the lighting fixtures are powered down. The active CDS is determined and stored in the memory device until the measured ambient light level is less than the active CDS, the lighting control system times out, or the Front Press switch is depressed. The CDS is not used until the lighting control system has timed out, or the lighting fixtures have been powered up or down via the Front Press switch, or powered up via the motion sensor. The active setting or offset for the CDS is used to reduce the likelihood of the lighting fixtures being powered up again immediately after the system 10 exits the setting mode.

The use of a daylight set switch SW6 is advantageous over prior lighting control systems which adjust ambient light settings using, for example, a potentiometer. These prior systems generally require a user to use a screwdriver or other tool to adjust ambient light settings which is more cumbersome and less convenient than using the switch SW6. Further, these prior systems generally require calibration of the light sensing device during factory testing and use of numerically accurate ambient light settings (e.g., number of foot candles). The present invention, in contrast, compares stored, relative values corresponding to the ambient light level desired by the user and measured ambient light levels. Photocell calibration is not required during factory testing because the system 10 uses the ambient light level reading as a relative reading when the occupant depresses the daylight set switch SW6. The microprocessor compares the actual ambient light level reading to the CDS. Thus, no calibration is required. It is possible a range check for daylight setting can be done in the test mode, but it is not required.

If the user realizes he or she has made a mistake and does not wish to set the CDS to the current ambient light level in the room, the user can depress any switch except the daylight set switch while in the measurement stage, and the previous ambient light settings remain unchanged. If the user depresses the daylight set switch SW6 for greater than 6 seconds, the microprocessor 70 is programmed to drive the buzzer BZ1 to generate two tones after 3 seconds and three tones after 6 seconds. Further, the LEDs are driven such that the light pipe flashes amber. The microprocessor 70 changes the CDS to the default value if the switch SW6 is released before 9 seconds have elapsed. The factory default maximum value has an upper limit setting of infinite ft-cd; however, this upper limit can be changed and the photocell can be completely disabled. For example, the default value can be stored in non-masked areas on the PCB and loaded during manufacturing, or downloaded via an external data input device. In addition, the default setting can be preset in the factory in a non-volatile memory (NVM) device as an offset to a value stored in the microprocessor ROM.

As stated previously, the DIP switch SW2 (FIG. 8) can also be used to configure the lighting control system 10 to operate in accordance with a manual or an automatic mode of operation. The ability to configure the lighting control system 10 to operate in one of two available modes, that is, the manual or the automatic mode, presents a number of advantages over existing lighting control systems that use motion sensing, but only operate in an automatic mode. If the lighting control system is in the manual mode, the use of two different colors for the LEDs enables occupants to know whether the lighting fixtures are powered down due to the daylight inhibit function (i.e., the green LED is driven) or simply because the lighting fixtures have been powered down after the system has timed out (i.e., the red LED is driven). As described above, the daylight inhibit function prevents the lighting fixtures from being powered up even though an occupant may wish them to be powered up. The daylight inhibit function can be overridden by activating the Front Press switch and, therefore, powering up the lighting fixtures. When the system 10 detects motion and the lighting fixtures are prevented from being powered up, the LED is driven to a solid green. The occupant can therefore decide if he or she wishes to override the daylight inhibit setting by depressing the Front Press switch (a MPB-type switch SW4 in FIG. 16) to power up the lighting fixtures. The CDS is therefore overridden. In addition, if the lighting control system is set for the manual mode of operation, or is set for the automatic mode of operation and is currently in manual override, the LED is driven to a solid red when motion is detected. The system can therefore be located in the dark, since the red LED functions as an active night light.

During the manual mode of operation, lighting fixtures 14, which have been powered down, remain powered down when no occupant is in the room for a greater period of time than the TO value, or when a user or occupant depresses the Front Press switch SW4 (FIG. 8) to power down the lighting fixtures manually and the system has subsequently timed out. When an occupant enters the room and the motion sensing circuit 76 detects the occupant, the lighting fixtures 14 remain powered down if the measured ambient final value is greater than the CDS. Accordingly, the microprocessor 70 drives the LED 84" to solid green, indicating daylight inhibit is in effect. If daylight inhibit has not been selected via the daylight set switch SW6, the lighting fixtures are powered down and the LED 84" is driven to solid red to function as a night light. For each motion detected in the zone of operation, the microprocessor is programmed to flash off the operating LED from its solid green or red color. The flashing off for motor detected continues until the system 10 times out, or the Front Press switch SW4 is depressed and the system 10 accordingly times out. It is possible for the microprocessor to switch from driving the solid red LED 84' to the solid green LED 84", or from the solid green LED 84" to the solid red LED 84', during this time period. This transition in color indicates the level at which the CDS is set. Once the Front Press switch SW4 is depressed, the lighting fixtures are powered up, and the operating LED is powered down. The LED 84' is subsequently flashed red upon each detection of motion.

Once the lighting fixtures have been powered up, measured ambient light levels exceeding the CDS do not cause the lighting fixtures to be powered down. The lighting fixtures remain powered up until the system 10 times out as per the TO value, or the Front Press switch SW4 is depressed. If the Front Press switch is depressed to power down the lighting fixtures, the system 10 is placed in a manual override mode. When in the manual override mode, the lighting fixtures remain powered down for a 30 minute time out period from last detected motion. As stated previously, this 30 minute period can be changed to other values. The lighting fixtures remain powered down until the Front Press switch is depressed, or the system 10 times out.

During the automatic mode of operation, lighting fixtures 14 remain powered down when no occupant in the room is detected for a period of time greater that the TO value or when the Front Press switch SW4 is depressed to power down the lighting fixtures and the system 10 is timing itself out in accordance with the preset 30 minute TO value described above. The lighting fixtures remain powered down until an occupant enters the room and is detected by the motion sensor. The red LED 84' flashes for each detection while the ambient light level in the room is monitored. If the measured ambient light level final value is greater than the CDS, the lighting fixtures remain powered down while the green LED 84" is driven to indicate that the daylight inhibit threshold has been exceeded. While in the daylight inhibit mode, the LED is flashed off for each detected motion. If the ambient light level decreases such that a new measured ambient light level final value is less than the CDS, the lighting fixtures are powered up upon the next detection of motion. If the ambient light level increases once again, the lighting fixtures are not powered down, but rather continue to be powered up until the system 10 times out, or the Front Press switch SW4 is depressed. Thus, unlike the manual mode, the lighting fixtures can be powered up upon detection of motion and ambient light levels below the CDS, without having to use the Front Press switch. Once the lighting fixtures are powered on, the LEDs remain powered down, except when flashing red upon detected motion, until the lighting control system times out or is manually turned off via the Front Press switch.

When the lighting control system 10 is manually turned off via the Front Press switch SW4 while in the automatic operational mode, the system is considered to be in the manual override mode. Once the lighting fixtures are powered down, the microprocessor sets the time out value to 30 minutes in this example; however, the manual override time out period can be set to other values. The green or red LED is driven to a solid illuminated color depending on the presently measured ambient final value. The LED remains a solid color and flashes off upon detected motion until it is returned to normal operation in the automatic mode. If the Front Press switch is depressed before time out, the lighting fixtures are once again powered up, and the system 10 is returned to normal operation in the automatic mode. The LED changes from a solid color, lighting fixtures being powered down, to flashing red upon detection of motion.

When in the automatic mode, an occupant can power up the lighting fixtures either automatically or by overriding the daylight inhibit function. When the occupant wishes to present a slide show or give another type of presentation with the lighting fixtures powered down, the occupant does not expect much motion to occur. It is therefore possible that the lighting control system can time out prematurely for the audience due to the TO value and power up the lighting fixtures again upon detected motion. The manual override feature is advantageous because it permits an occupant or user of an automatic system to power down the lighting fixtures, and have the present TO value set automatically to a longer time out of, for example, 30 minutes. Thus, the system 10 operates using a 30 minute time out period, as opposed to the most recent TO value. The most recent TO value remains unaffected while the system 10 is in the manual override mode. The system 10 subsequently times out 30 minutes after the last motion is detected or the Front Press switch is depressed. The microprocessor 70 discards the 30 minute TO value, and once again uses the most recent TO value stored in the EEPROM 72.

Figure 11:
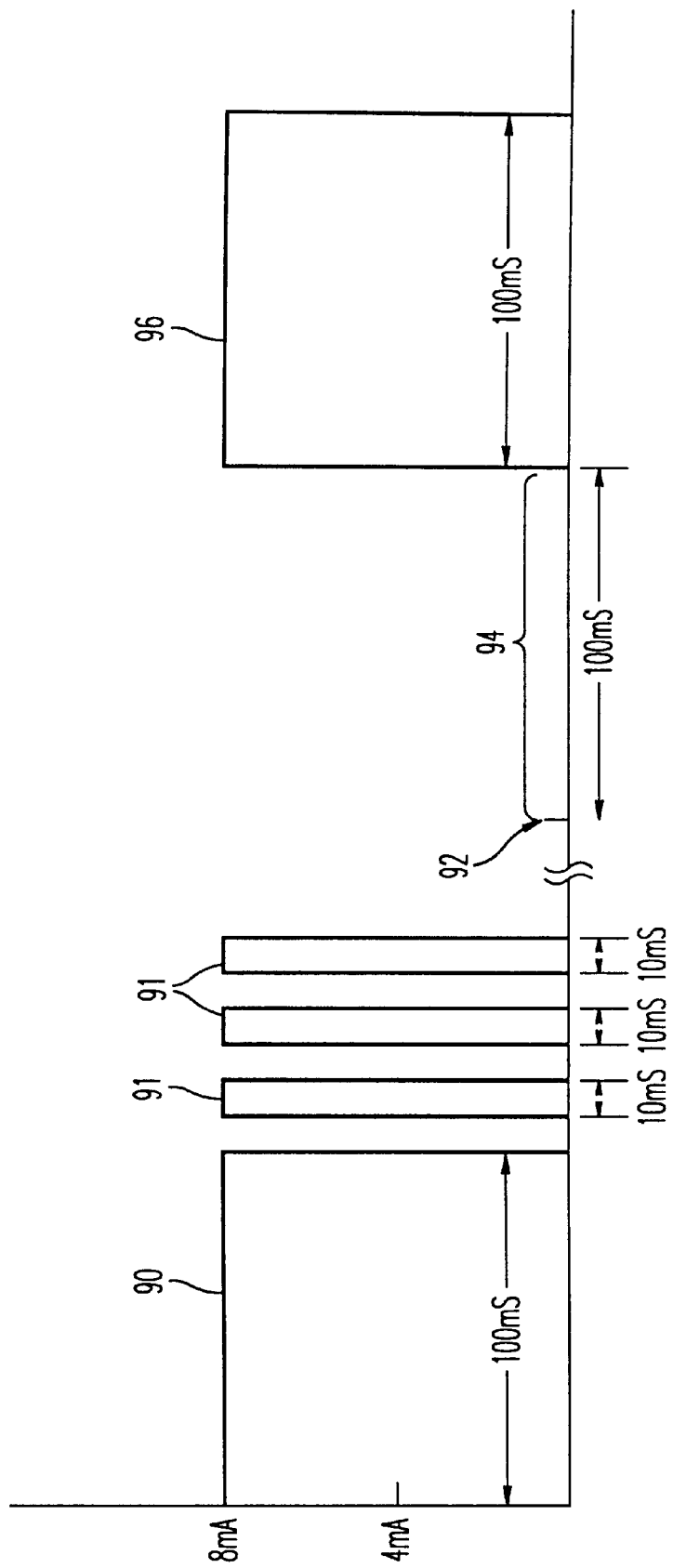
FIG. 11 is a graph illustrating duty cycling performed by a processing device to provide a bright flash and then reduce current drawn by an LED in accordance with an embodiment of the present invention.

Since the LEDs 84' and 84" (FIG. 9) draw more current than most components of the lighting control system (e.g., typically four to eight milliamps as compared to approximately 2 milliamps drawn by most circuit elements), the lighting control system 10 is configured to apply a duty cycle to the LEDs. For example, rather than driving an LED at a solid color for the entire time LED illumination is desired, the microprocessor drives each LED at a solid color and essentially at full brightness using a steady state signal 90 for 100 milliseconds, drawing 8 milliamps of current, and then pulses the LED at a frequency of less than 48 hertz at 4 milliamps for the remainder of the desired LED illumination period, as shown in FIG. 11. The frequency is sufficient for the LED 91 to appear to be solid to the human eye. Upon detection of motion, time out, activation of the Front Press switch or other condition 92, the microprocessor drives the LED at full brightness again 96 after a 100 millisecond period 94. The pulsing can be accomplished using a number of different methods. In accordance with one embodiment of the invention, the microprocessor is programmed to digitally control the duty cycling of the LED. The microprocessor outputs a pulse signal which is modulated using a step function. Another type of switching device can be used in lieu of the microprocessor.

Figure 12:
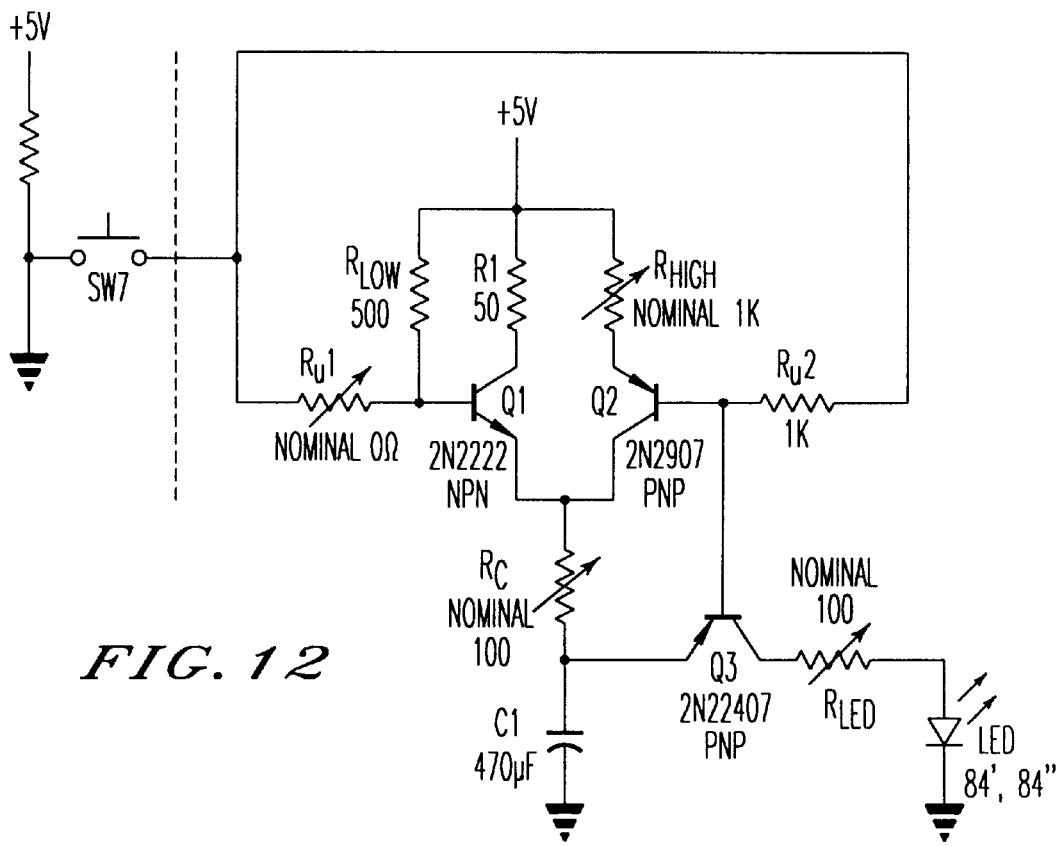
FIG. 12 is a schematic diagram of an analog LED driver circuit constructed in accordance with an embodiment of the present invention to provide a bright flash and then reduce current drawn by an LED.
Figure 13:
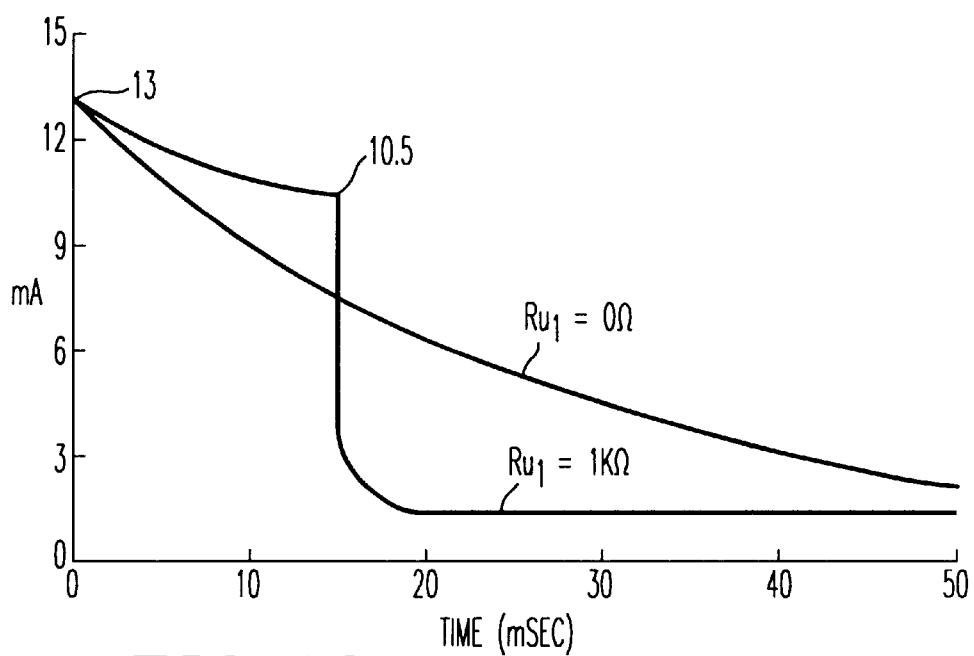
FIG. 13 is a graph illustrating a decrease in the current drawn by an LED driven by the circuit of FIG. 12.

In accordance with another embodiment of the invention the duty cycling of the LEDs is accomplished using an analog LED driver circuit 90 which is depicted in FIG. 12. In this embodiment, the capacitor C1 charges from a 5 volt signal via the resistor R1 and transistor Q1. The resistor $R_C$ controls how quickly the capacitor C1 charges. A switch SW7 is shown to represent the microprocessor 70 or another type of switching device. The microprocessor 70 does not generate a pulse signal but rather a steady state control signal to the base of transistor Q1. The transistor Q1 is turned off when the microprocessor or switching device closes and brings the base of the transistor Q1 to a low or zero voltage. Accordingly, the transistors Q2 and Q3 become conductive, the energy from the capacitor is discharged, and the LED is illuminated. The capacitor creates a pulsing effect via its discharging function, as shown in FIG. 13. Since the LED light level profile, including rate, duration, amplitude and slope, illustrated in FIG. 13 is a function of the resistor values, power source and the capacitor value, the resistors are shown as potentiometers for illustrative purposes. The capacitor value can be adjusted to increase the brightness of the initial LED flash and the duration of the subsequent brightness decay. The resistors $R_{HIGH}$ and $R_{LED}$ control the steady state LED output. The resistor $R_{u1}$ is preferably a nominal value and is used to control the state of the transistor Q1. If resistor $R_{u1}$ is increased, transistor Q1 is likely to remain on. The current profile in FIG. 13 is therefore likely to look more like a digital output, as shown by the line labelled $R_{u1}=1$ k ohm, than a gradually delaying linear output as shown by the line labeled $R_{u1}=0$ ohm. The current profile in FIG. 13 can also be achieved using the digital implementation described in connection with FIG. 11 by altering, for example, the duty cycle of the pulsed output signal from the microprocessor.

The lighting control system 10 is configured to provide system users with access to the various control switches, e.g., the TO set switch SW5, the fixed/adaptive timing mode switch SW2 and the daylight set switch SW6. In addition, the lighting control system is configured to permit users to change preprogrammed values and switch states, as described previously, to perform a test of system functions, and to accomplish a master reset function. The external input device interface 88 (FIG. 5) is in parallel with the EEPROM 72. An external input device (not shown) can be connected to the ports via J1-1 through J1-7 to communicate with the microprocessor 70 via the EEPROM 72. The external input device can therefore be used to enter or download data such as a new TO value, as well as a numerical pass code to ensure the user is authorized to alter the operation of the system 10.

In accordance with another embodiment of the invention, the housing 24 is provided with the jack 56 (FIG. 4) for connecting an external hand-held device or other one-way or two-way communication device to the microprocessor 70 to permit the downloading of data to, for example, the EEPROM 72 via twisted pair wires or a power line carrier. Further, the external communication device can download data simply via twisted pair wires without the jack. Thus, the maximum time out value can be changed from 30 to 60 minutes, in addition to changing other variables in the program code, providing failure modes and, providing sensor feedback data. Further, systems 10 can be configured for use remotely via the twisted pair wires. For example, in addition to motion sensing, various other sensors and transducers can be connected to the microprocessor 70. Several systems 10 can be controlled remotely by a central communication processing device for light dimming, HVAC, security and climate control purposes.

In accordance with another embodiment of the invention, access to various control switches for the purposes of changing, for example, the TO or daylight set values can be restricted to selected system users using pass codes. The microprocessor is programmed to require receipt of signals from two or more of the switches SW2, SW4, SW5 and SW6, which are depressed either simultaneously, or singularly and in a prescribed order, in accordance with the pass code. The signals from the switch can correspond to a binary code which is compared by the microprocessor with a valid pass code stored in the EEPROM. Once the required signals are verified as a valid pass code, the microprocessor is programmed to accept the user's changes to the configuration of the control system using the switches as described above. Occupants who do not know the pass code are not able to alter the system 10 using, for example, the TO set switch and the daylight set switch.

To perform a test of system functions, the microprocessor is connected to an MPB-type test switch SW3 (FIG. 5), which, when depressed, creates a time out period of preferably 15 seconds using fixed timing as opposed to adaptive timing. The lighting control system preferably operates in the fixed timing mode as opposed to the adapted timing mode during testing. In accordance with another embodiment of the invention, the TO set switch can be depressed for more than 3 seconds, and the TO value set to 15 seconds in accordance with the procedure described above (i.e., one press) in order to enter the test mode. The test mode is exited by changing the DIP switch SW2 from the fixed timing position to the adaptive timing position, allowing the system to time out automatically 5 minutes from the time the test mode was entered, or by depressing the TO set switch SW5 for greater than 3 seconds. A test mode can also be selected by using a combination of the daylight set switch SW6 and the Front Press switch SW4 corresponding to a pass code to achieve a 15 second daylight set value. Alternatively, the TO set switch SW5 and the Front Press switch SW4 can be depressed simultaneously for greater than three seconds. For master reset, both the TO set switch and the daylight set switch can be depressed simultaneously for 6 seconds. The microprocessor responds by resetting the TO and daylight set values to default values and subsequently resetting the microprocessor. The microprocessor drives the buzzer to generate a short, distinctive tone every 2 seconds during the test mode. Since the system 10 times out after a shortened TO period during the test mode, the system cannot be accidentally left in the test mode, as can some existing lighting control systems which require activation of a test switch to enter and to exit the test mode.

The buzzer BZ1 is preferably a tone generator model no. OBO-15220 manufactured by Obo Seahorn Electronic Co., Ltd., Taipei, Taiwan. The circuit generates a 70 decibel, 500 to 4000 Hertz tone. The buzzer provides a soft tone (e.g., 4 beeps over approximately a 0.5 second duration) five seconds prior to time out to indicate an impending power down of the lighting fixtures, giving an occupant the opportunity to prevent false power down by moving. Thus, occupants are not left in a room without light because they have not moved above sufficiently for their presence to be detected. The buzzer also provides other feedback information to a user or occupant. For example, the buzzer generates a single tone whenever any one (except the Front Press switch) of the switches is depressed, and a series of tones when playing back the current TO setting or setting the photocell sensor. The buzzer generates a single tone upon successful power up, or when aborting a playback or setting mode. The operation of the buzzer when using the TO set switch is described above.

Regarding the zero-crossing detection circuit 80 (FIG. 16), the microprocessor coordinates relay K1 switching time with detected zero-crossing times in the 60 Hertz AC power lighting circuit and delays associated with a number of devices in the control circuit. For example, the relay K1 requires approximately 2 milliseconds to open the lighting load circuit in response to a command from the microprocessor. Once a current zero-crossing is detected, the microprocessor subtracts the delay associated with the relay K1 from the next zero-crossing (which occurs, for example, at 0, 8 and 16 milliseconds within a full cycle of a 60 Hertz signal) to ensure that the contact opens at a zero current level point in the power signal. Relay contact life is therefore increased.

The microprocessor determines the MTV by analyzing the level of occupant activity in the field of view of the motion sensor, and performing a successive approximation to derive the optimum TO value between the minimum value established by the UST and the preprogrammed maximum value (e.g., 30 minutes). When the UST is too short, that is, the TO period has expired and an occupant's presence is still detected in the room, the occupant receives a tone generated by the buzzer. The tone is preferably generated 5 seconds before the end of the TO period and, consequently, power down of the lighting fixtures. In the manual mode, an occupant has a grace period of approximately 10 seconds to create an effective motion, that is, motion sufficient for detection, to cause the microprocessor to power up the lighting fixtures once they have been powered down after time out. The occupant need not depress the Front Press switch in order to power up the lighting fixtures when the system is in the automatic mode. An occupant can, however, use the Front Press to power down lighting fixtures which have been previously powered up automatically.

The operation of the lighting control system will now be described in connection with the flow chart depicted in FIG. 14. After the lighting control system is installed (i.e., mounted on a wall and connected to power lines that supply AC power to lighting fixtures within the operational area of the system), the power ON/OFF slide switch SW1 (FIG. 16) is moved to the AUTO position (i.e., ON). Consequently, AC power is converted to a DC voltage for operating the microprocessor 70. The microprocessor 70 subsequently undergoes initialization (block 100) and a self-test routing (block 102).

The microprocessor initially sets the following values: (1) the daylight threshold value DTV=not operational or no daylight inhibit desired; (2) UST=15 minutes; (3) maximum allowable TO=30 minutes; (4) FIXED/ADAPTIVE switch SW2 to adaptive timing mode; and (5) MANUAL/AUTO switch SW2 to automatic operation mode. For subsequent start-ups (e.g., AC power failure or SW1 reset), these values are set to the most recent values entered by a user. Each time the system 10 is powered up, the microprocessor undergoes a self-test routing that lasts approximately 10 seconds. During the self-test routine, the microprocessor flashes the LEDs red and green, illuminates the light pipe to amber, and then performs a checksum operation on the contents of the microprocessor ROM. If the checksum confirms data integrity, the microprocessor flashes the green LED; otherwise, the self-test routine begins again. The microprocessor performs a RAM pattern test, that is, an EEPROM validation test, and determines whether or not a factory test jumper has been installed. The green LED is flashed if the RAM pattern test is failed; otherwise, the self-test routine begins again. If the EEPROM is valid and no factory test jumper is installed, the green LED is flashed, and the self-test progresses. If the EEPROM is invalid or a test jumper is installed, factory defaults are read from the ROM and written to the EEPROM. The validity of the EEPROM is checked once, and then a second time if it is valid. If the first of these validity tests is failed, the factory defaults are written to the EEPROM again. If the second validity test is failed, the factory defaults are written to the EEPROM again, the red LED is flashed, and the buzzer is driven to generate two beeps.

The LEDs 84' and 84" are driven during self-test to indicate the firmware revision number in binary code (e.g., a green LED flash represents a binary zero and a red LED flash represents a binary one). The lighting fixtures are powered up, and a timer is set to MTV. The motion sensing circuit is permitted time to warm up. The microprocessor 70 finally checks each MPB and switch to determine if any are on and therefore are stuck, and generates flags accordingly. If the button or switch that is stuck is later found to be unpressed, the corresponding flag is cleared from the EEPROM 72 for that button or switch.

Figure 14A:
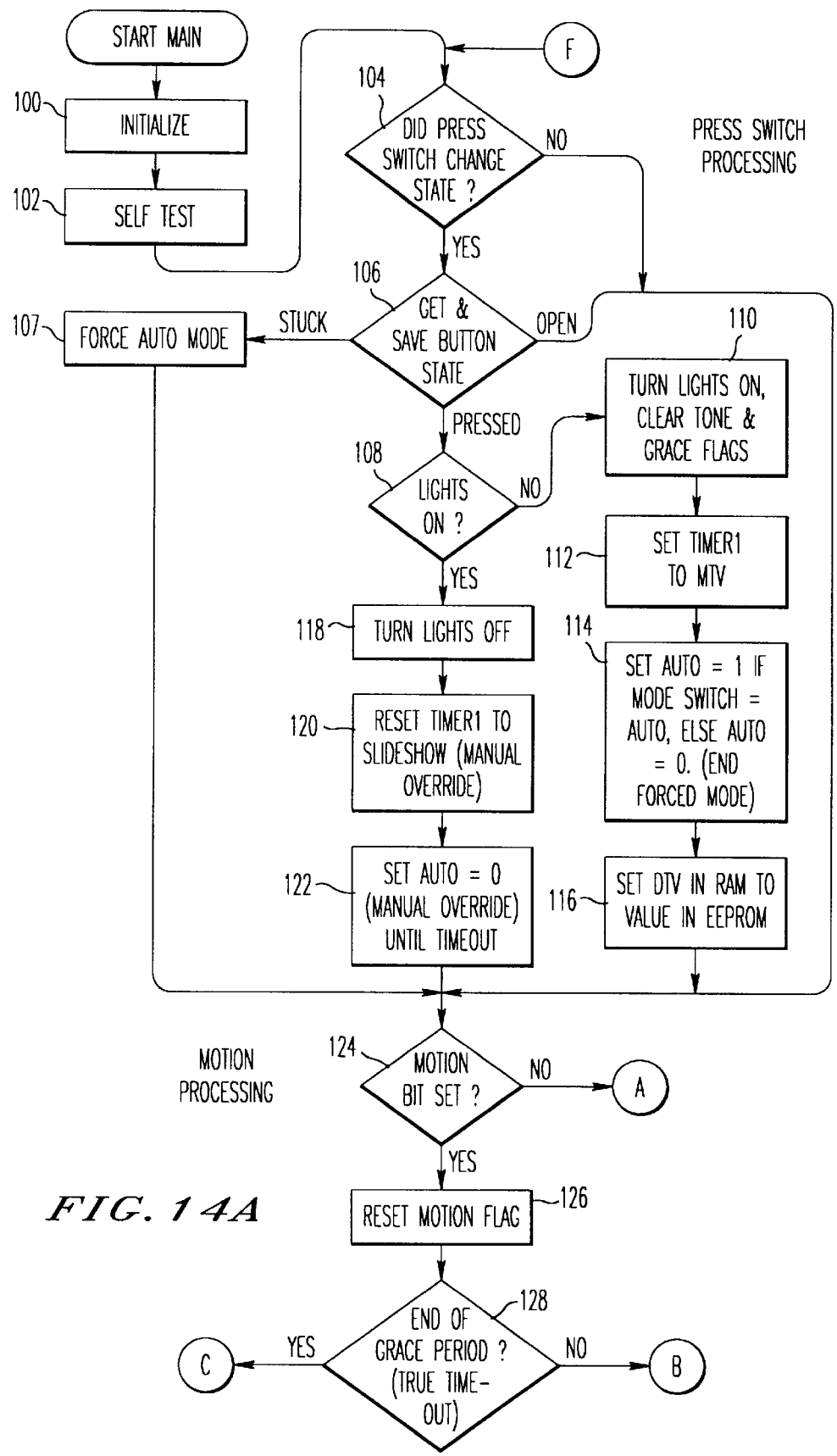
FIGS. 14A, 14B and 14C are a flow charts depicting an overall sequence of operations for the lighting control system in accordance with an embodiment of the present invention.
Figure 14B:
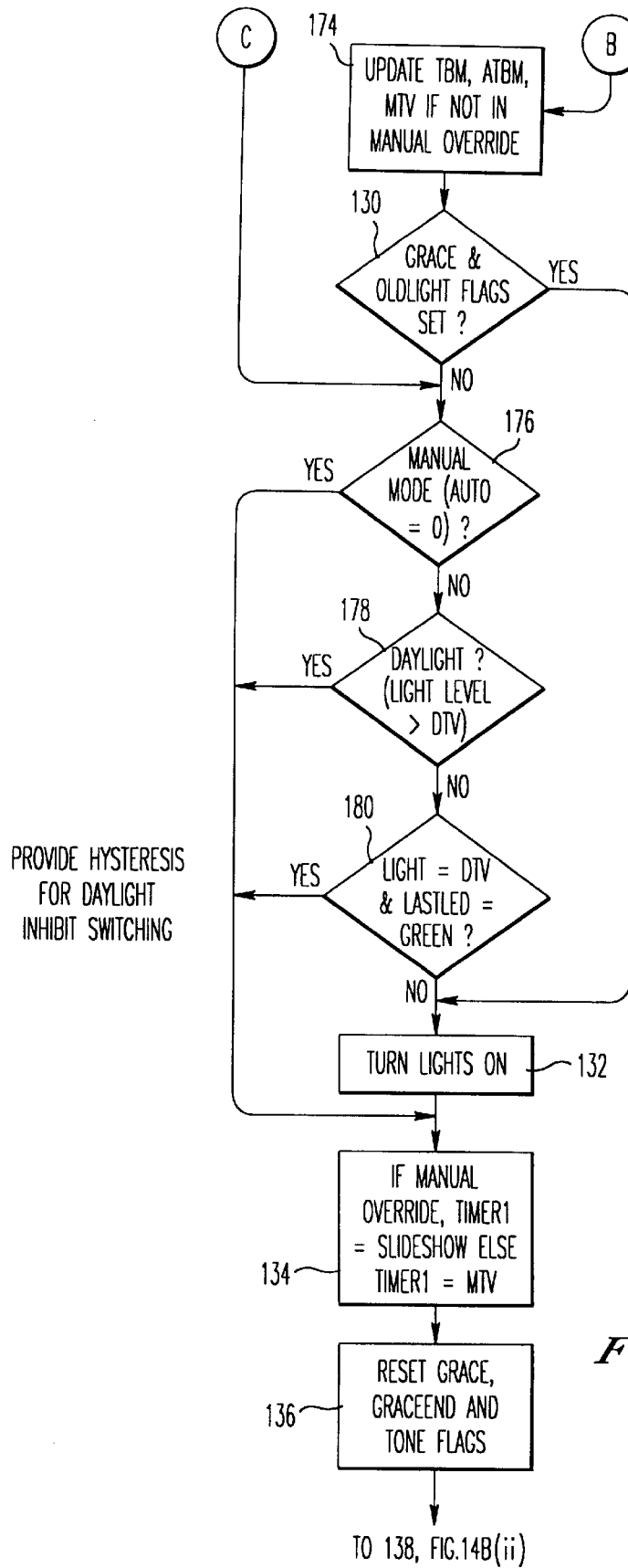
Figure 14C:
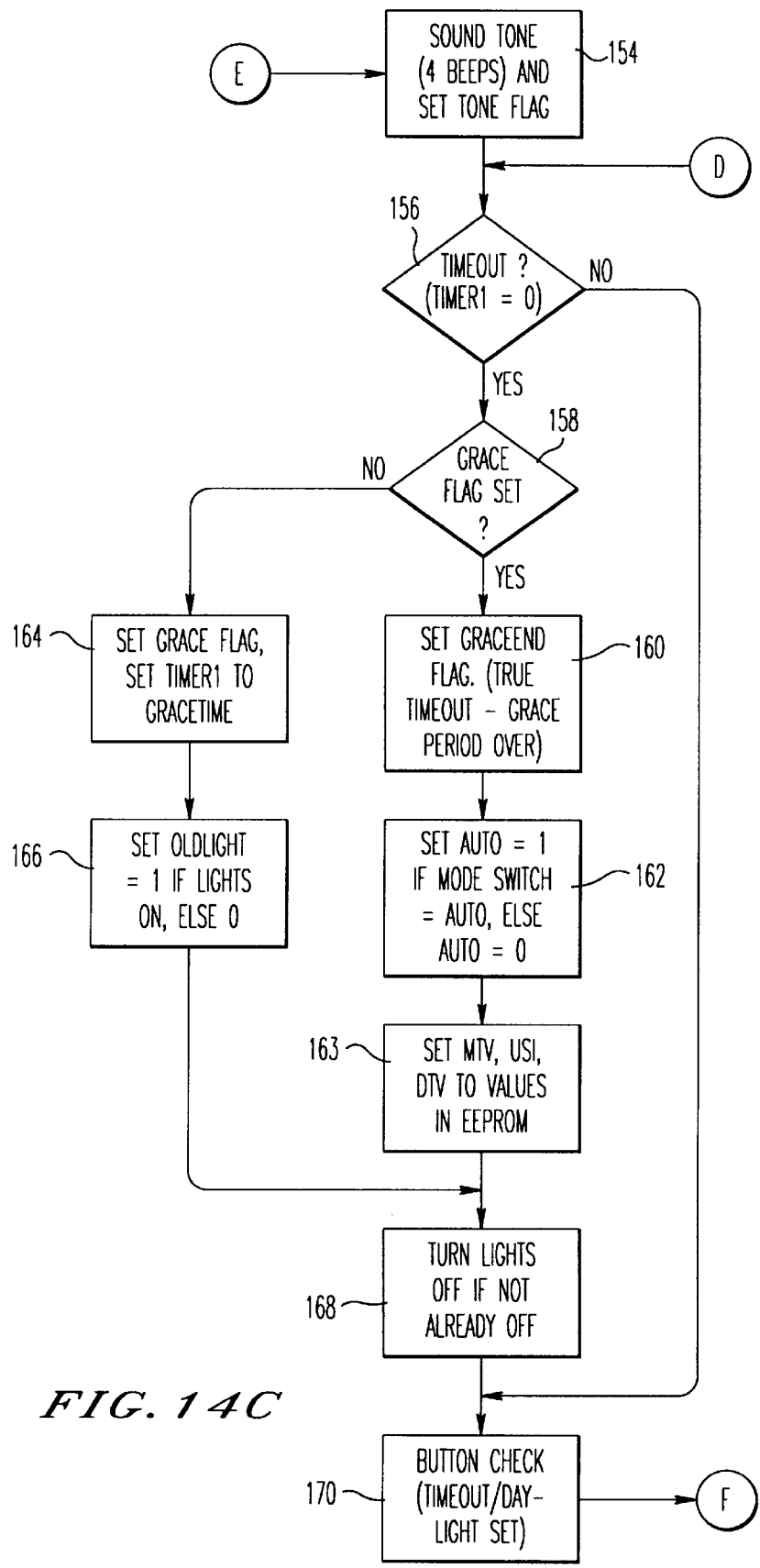

Upon completion of a successful self-test, the buzzer BZ1 is driven to generate a double tone before the microprocessor 70 continues to operate in accordance with the remaining sequence of operations in the main routine depicted in FIG. 14. If the system 10 has failed a non-critical part of the self-test (e.g., the Front Press switch is stuck, or the microprocessor cannot read from the EEPROM), the microprocessor is programmed to operate in a recovery mode. In the recovery mode, the microprocessor initializes the system 10 in accordance with a predetermined alternative mode of operation or condition depending upon which part of the self-test was failed. For example, a fixed TO value is used if the TO set button is stuck and adaptive timing is selected. Default values are used in lieu of values stored in the EEPROM if the EEPROM is invalid. If the Front Press switch is stuck, the microprocessor operates in accordance with the automatic and adaptive timing modes. Automatic mode operation is used when the MANUAL/AUTO switch is stuck. The recovery mode therefore gives occupants the benefit of a damaged or defective system 10 that is, for the most part, operational until it can be replaced or repaired. In the meantime, the microprocessor is programmed to illuminate the LEDs in various feedback sequences which indicate, in a unique manner, the reason for each system malfunction and, accordingly, self-test failure. If the system 10 is powered up via relay SW1 but not operational, even in the recovery mode, the microprocessor repeatedly illuminates the LEDs to cyclically illuminate the light pipe wiring, for example, red, green and amber colors.

With reference to block 104 in FIG. 14, the microprocessor determines whether or not the Front Press switch SW4 (FIG. 16) has changed states and saves the button state in the EEPROM (block 106). The remainder of the flow chart shall hereinafter be described for illustrative purposes as if the system 10 is configured to operate in a manual mode, using fixed versus adaptive timing, and with the daylight inhibit function disengaged. Descriptions of the automatic, adaptive timing, and the daylight inhibit modes of operation will be described thereafter.

If the Front Press switch SW4 is determined to be stuck, the microprocessor 70 forces the lighting control system 10 into the automatic mode of operation (block 107). If the Front Press switch has been depressed and the lighting fixtures are powered down (block 108), the microprocessor controls the relay K1 to power up the lighting fixtures (block 110). The microprocessor also clears TONE and GRACE flags which are defined in the program code and whose states are stored in the RAM. A timer (e.g., a counter or software-implemented timer) associated with the microprocessor is set to MTV (block 112). Since the lighting fixtures have been powered up as a result of a user or an occupant pressing the Front Press switch, the microprocessor sets a variable called AUTO to the value one or zero, depending on the position of the manual/AUTO switch SW, to cancel any manual override mode request (block 114). DTV is set to a value stored in the EEPROM, thereby canceling any offset invoked. The offset DTV is preferably canceled when the lighting fixtures are powered up for consistency. Thus, the system 10 behaves the same way, whether the Front Press switch is depressed or the occupant moves. The offset DTV is also canceled at GRACEEND.

If the lighting fixtures were already powered up when the Front Press switch was depressed (block 108), the microprocessor operates the relay K1 to power down the lighting fixtures (block 118). The timer is subsequently set to a slideshow value of 30 minutes in accordance with the manual override function (block 120). The variable AUTO is set to zero to indicate that the system is in the manual override mode until time out is achieved (block 122).

If the motion sensing circuit detects motion in the lighted area (block 124), a flag called MOTION is reset (block 126). GRACE and OLDLIGHT flags are set to represent that the system 10 is operating in a grace period and that the lighting fixtures were powered up before the start of the grace period. If the end of the grace period has not been reached (block 128), and the GRACE and OLDLIGHT flags have been set (block 130), the lighting fixtures are powered on (block 132) and DTV restored from the EEPROM 72. Thus, the lighting fixtures are powered up once again because motion was detected within the 10 second grace period following time out in the manual mode. The DTV is subsequently set from a value stored in the EEPROM 72.

If the system 10 is operating in a manual override mode, the timer is set to the slideshow value of 30 minutes; otherwise, the timer is set to MTV which is equivalent to UST in the manual mode (block 134). The microprocessor resets the GRACE, GRACEEND, and the TONE flags (block 136). The GRACE flag is set to one if the system 10 is operating in a grace period. The OLDLIGHT flag is set to one if the lighting fixtures were powered up before time out. Since the lighting fixtures are powered up (block 138), the red LED is driven to flash (block 140). A variable LASTLED is set at a binary number representing the current LED color being displayed (block 142).

If motion is not detected (block 124), and if the system 10 has timed out, or the lighting fixtures are powered up, the microprocessor powers down the LED (blocks 144 and 146). If time out has occurred (block 144) and the daylight inhibit function has been disabled, as in the present example, the red LED is powered up (block 150). The solid red LED operates as a nightlight, as stated previously, as long as no motion is detected.

The microprocessor reads the value of the timer to determine if there are fewer than 5 seconds left in the time out period and if the TONE flag is clear (block 152). If the TONE flag is clear (e.g., no tone has been generated), the microprocessor drives the buzzer to generate a tone and sets the TONE flag to the value of one (block 154). If time out is reached (i.e., the timer value is zero) (block 156), and if the GRACE flag is set to indicate that the grace period is over (block 158), the GRACEEND flag is set to represent that true time out has occurred and the grace period is over (block 160). The microprocessor sets the variable AUTO to the value of one if the mode has changed to automatic operation; otherwise, AUTO is set to the value of zero (block 162), which means the system 10 is set to operate in the manual mode. MTV is set to UST (block 163). Further, DTV is set to a value stored in the EEPROM.

If the GRACE flag is not set (block 158), that is, the grace period has not yet started, the microprocessor sets the GRACE flag to a value of one value and sets the timer equivalent to the value of GRACETIME. The value GRACETIME is stored in the EEPROM as ten seconds (block 164). The OLDLIGHT flag is set to the value one if the lighting fixtures are powered up; otherwise, it is set to a zero value (block 166). The microprocessor subsequently operates the relay K1 to power down the lighting fixtures (block 168). The microprocessor then performs a routing to monitor the status of the time and daylight inhibit switches SW5 and SW6 (block 170).

Figure 15A:
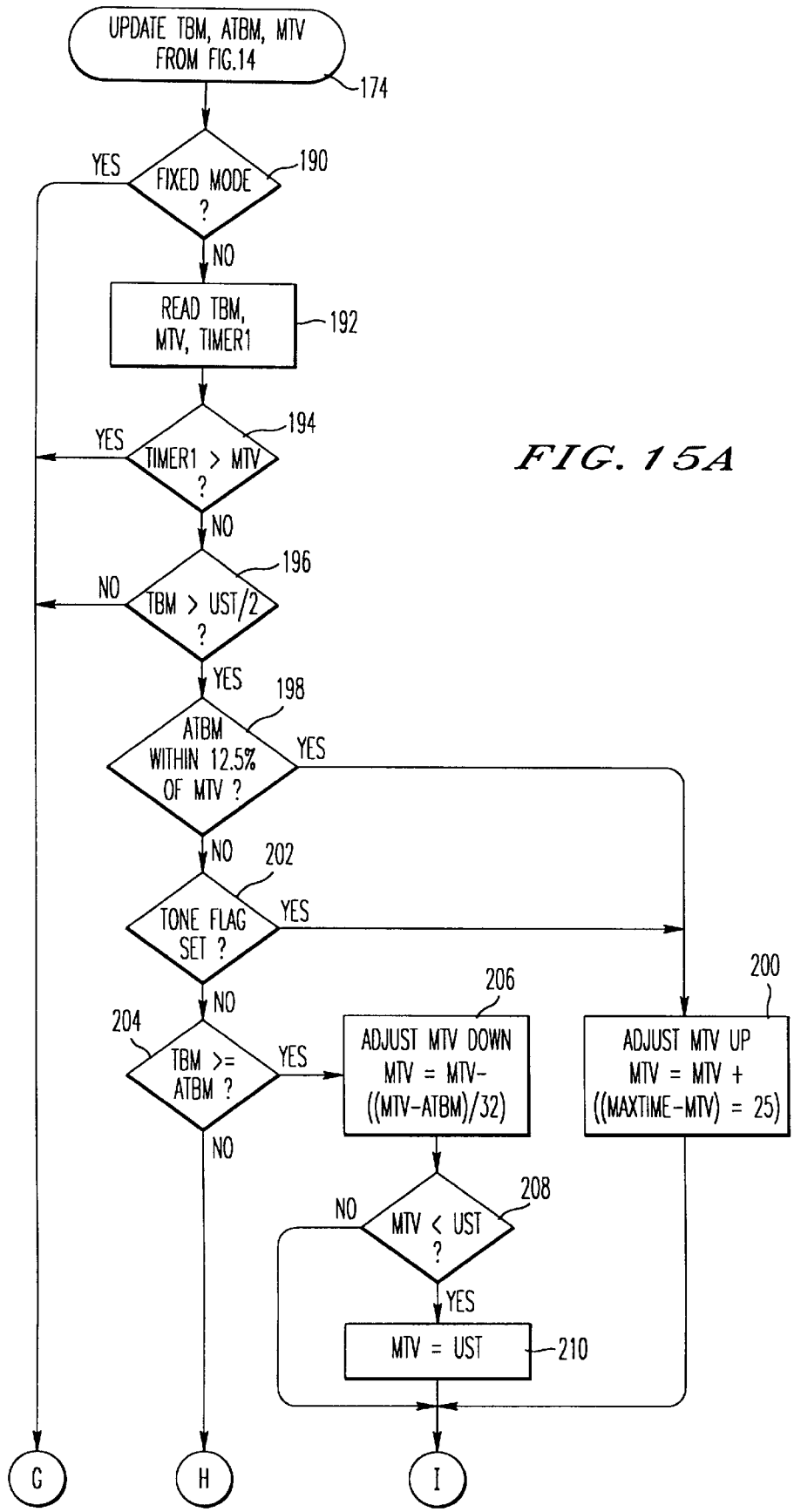
FIG. 15 is a flow chart depicting a sequence of operations for adjusting the motion time out value (MTV) during the adaptive timing mode in accordance with an embodiment of the present invention.
Figure 15B:
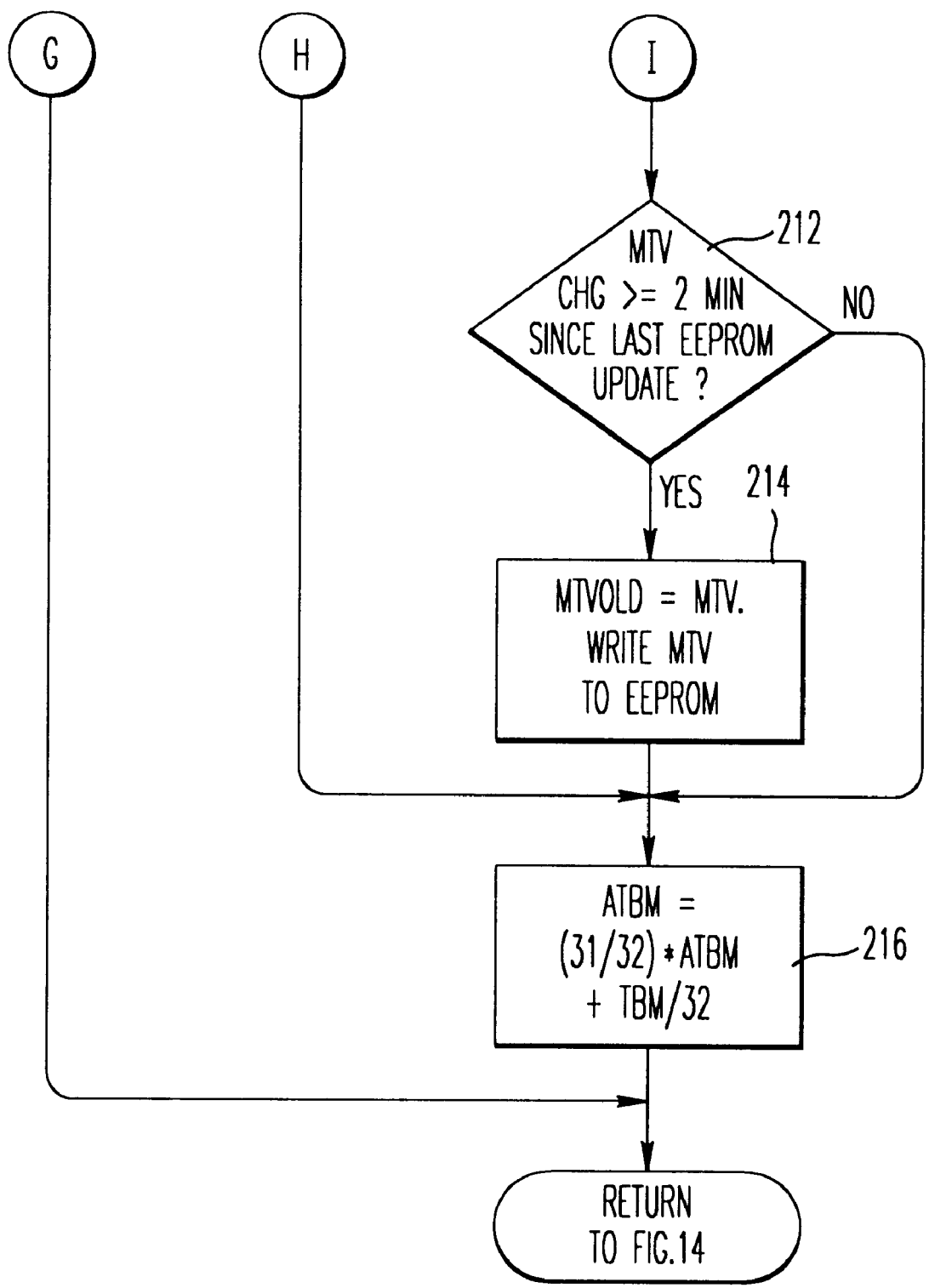

If the daylight inhibit function is enabled, the microprocessor 70 drives the green LED (block 172) as opposed to the red LED when the system has not timed out. If adaptive timing has been selected in lieu of fixed timing, the microprocessor calculates a new MTV (block 174) in accordance with a sequence of operations described below in connection with FIG. 15, provided the system is not in the manual override mode.

If the system is operating in the automatic mode, as opposed to the manual mode, a new MTV is calculated (block 174), and the lighting fixtures are powered up (block 132), provided the ambient light level is less than DTV when the daylight inhibit function is enabled. The timer is then reset to MTV (block 134). When operating in the automatic mode (block 176), the microprocessor determines if the ambient light level is greater than DTV (block 178) and if the LASTLED is equivalent to a value corresponding to the color green (block 180). If the three conditions in blocks 176, 178 and 180 are true, the microprocessor does not power up the lighting fixtures because of sufficient ambient light levels detected while operating in the daylight inhibit mode.

The calculation of MTV will be described now in connection with FIG. 15. This process is not undertaken by the microprocessor when the system is configured to operate in the fixed timing mode (block 190). The microprocessor reads TBM, MTV and TIMER from the EEPROM (block 192). The variable TBM corresponds to time between detected occurrences of motion, that is, the time that has elapsed since the last motion was detected. TBM can range in value from zero to MTV. If the lighting fixtures are powered down, the microprocessor begins to calculate a new TBM when the next detected motion occurs. A history of the most recent TBM values are stored on a FIFO basis in the EEPROM from calculating the average time between movements, which are hereinafter referred to as ATBM. The number of time of motion samples depends on available memory and acceptable accuracy. A history of the most recent times of motions and MTV values are preferably stored in a NVM to retain data after powering down the lighting control system. If the timer value is greater than MTV (block 194), programmed control of the microprocessor continues as described in FIG. 14; otherwise, the microprocessor determines whether the most recent TBM is greater than one-half the value of UST (block 196).

The microprocessor 70 calculates the value ATBM to determine whether it is greater than seven-eights of MTV or within 12.5% of MTV (block 198). ATBM is calculated by taking a decaying average of successive TBM values and is useful as a guide for determining an adjusted TO value, that is, actual UST, instead of the UST value selected by the system user. As indicated in block 196, ATBM is preferably updated only if TBM is greater than half of UST. This criterion prevents successive movements, such as an occupant walking across the room, from causing unnecessary adjustments to the ATBM value. One-half of UST is used as the criterion instead of UST to permit adjustment of ATBM below the UST in the event that UST is a large value.

If ATBM is within 12.5% of MTV, MTV is adjusted to a greater value. When MTV is being increased, the following equation is used (block 200):

$$MTV = MTV + \frac{(MAX - MTV)}{4}$$

In the present example, MAX is equal to 30 minutes. If ATBM is not within 12.5% of MTV (block 198), the microprocessor determines whether the TONE flag has been set (block 202). If it has, MTV is adjusted again to a larger value (block 200); otherwise, the microprocessor determines whether TBM is greater than ATBM (block 204).

If time between movements (TBM) is greater than one-half of UST, and a smaller value than MTV less five seconds, MTV is adjusted to a smaller value using the following equation (block 206):

$$MTV = MTV - \frac{(MTV - ATBM)}{32}$$

If MTV is adjusted to a value that is less than UST (block 208), the microprocessor 70 sets the MTV value equal to UST (block 210); otherwise, the MTV value calculated in block 206 is retained. In order to prevent trivial EEPROM 72 updates, the new MTV value calculated in blocks 206 or 200 is not written to the EEPROM unless more than two minutes have elapsed since the last EEPROM update (blocks 212 and 214). The existing MTV value is written to variable MTVOLD and retained. As with the TBMs, successive MTV values are stored on a FIFO basis. ATBM is subsequently calculated using the most recent TBM value. The equation for ATBM is as follows:

$$ATBM = \frac{(31 \cdot ATBM)}{32} + \frac{TBM}{32}$$

The exemplary algorithm for determining MTV described above determines a TO value (i.e., MTV) larger than the UST to be the MTV. The microprocessor can, however, be programmed to derive a MTV that is less than the UST. Further, the microprocessor 70 can control the lighting control system 10 without the user having to specify a UST at all, that is, the microprocessor 70 tracks the occupants' motions over time to establish a pattern of the occupants' habits and determines the optimum TO value without disrupting the occupant with false powering down of the lighting fixtures, while at the same time maximizing energy savings.

In accordance with another embodiment of the invention, a power supply control circuit is depicted in FIG. 17 for use with the system 10. The power supply control circuit depicted in FIG. 17 is advantageous because it can operate with larger primary loads than the power supply circuit in FIG. 16, while preventing the transformer from becoming too hot. The power supply circuit provides pulsed power versus steady state power to circuit components requiring more than a 5 volt regulated signal (e.g., the relay K1, the buzzer and the LEDs) in accordance with a signal generated by the microprocessor. The transformer T1 is not required to provide high, continuous secondary current (i.e., power demand) due to the pulsed power demand load and therefore is not allowed sufficient time to heat up to an undesirable temperature. Pulses are generated as required by the microprocessor after the LEDs, buzzer and relay K1 are energized so that the capacitor C17 can be recharged. When the microprocessor asserts a pulsed signal (e.g., a 5 volt signal, or a low signal if transistor Q8 is a PNP-type transistor) to the transistor Q8, the transistors Q7 and Q8 conduct and therefore shunt higher current around the resistor R45 to the capacitor C17 for a fast charge for discharging at a later time when, for example, the 8.2 volt supply is needed to energize a system 10 component such as the buzzer BZ1. The diode D18 shunt regulates 8.2 volts to limit the voltage operational ratings of the capacitor C17 and other loads. The power supply control circuit allows increased line side or lighting fixture load, while decreasing the transformer T1 temperature and the current drawn from its secondary winding. The secondary winding current is maintained at a level only as high as necessary to drive secondary circuits.

In accordance with another aspect of the invention, the system 10 is configured for factory testing various components thereof. The PCB 46 is preferably electronically connected to a power board comprising the components depicted in FIG. 16 via a high current ribbon cable. The two boards can then be inserted into a test fixture. To begin the test, a number of pins or pads on one of the boards can be mechanically connected to an external test plug or to pogo pins. The test mode can be initialized or asserted through the mechanical connection or from an external computer via the pins and pads. Alternatively, the test mode can be initialized or asserted electronically via an external computer via the external input device interface 88 or the jack 36 or twisted pair. Further, a dedicated test switch SW3 (FIG. 5) can be activated.

Figure 18A:
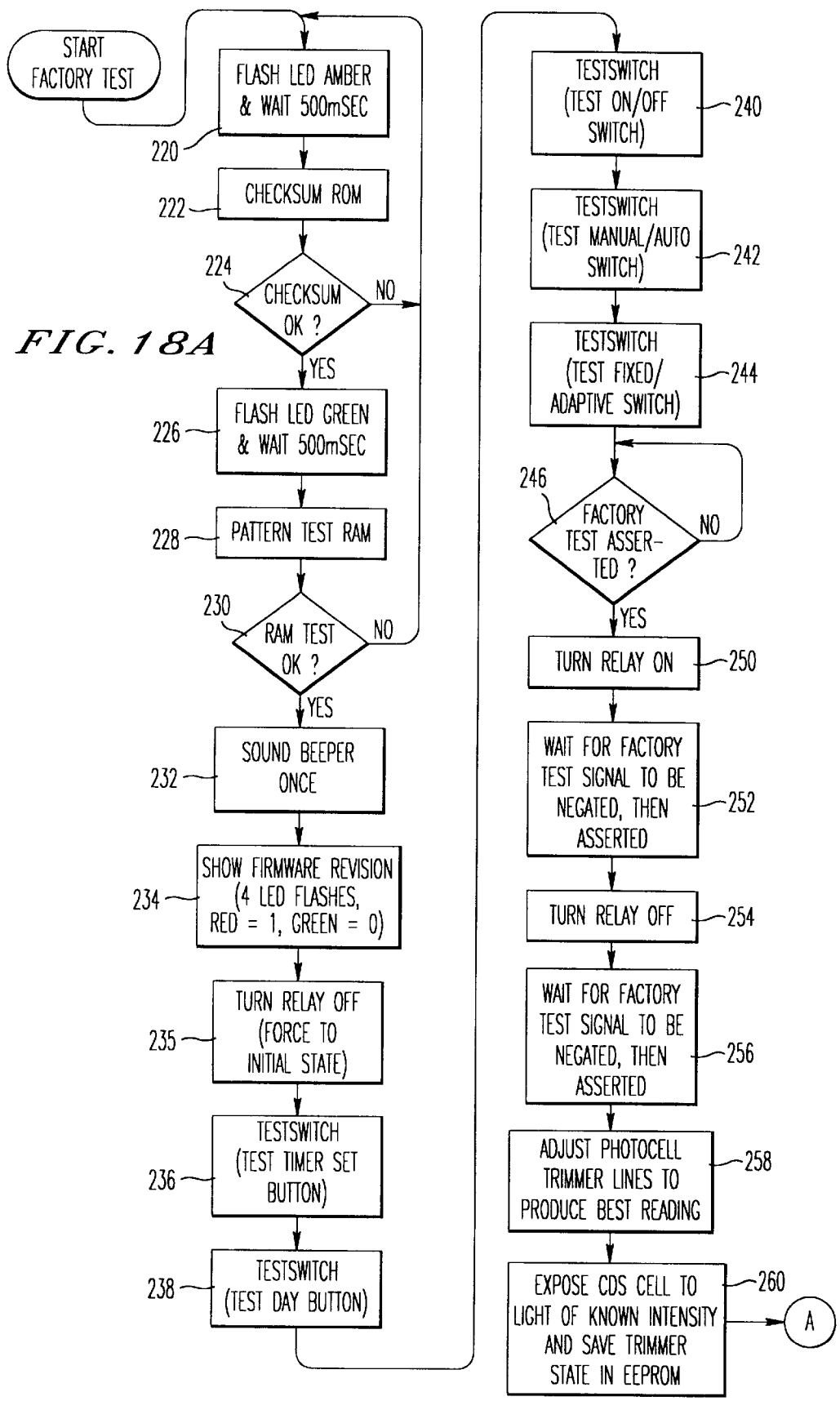
FIG. 18 is a flow chart depicting a sequence of operations for performing a factory test of a lighting control system in accordance with an embodiment of the present invention.
Figure 18B:
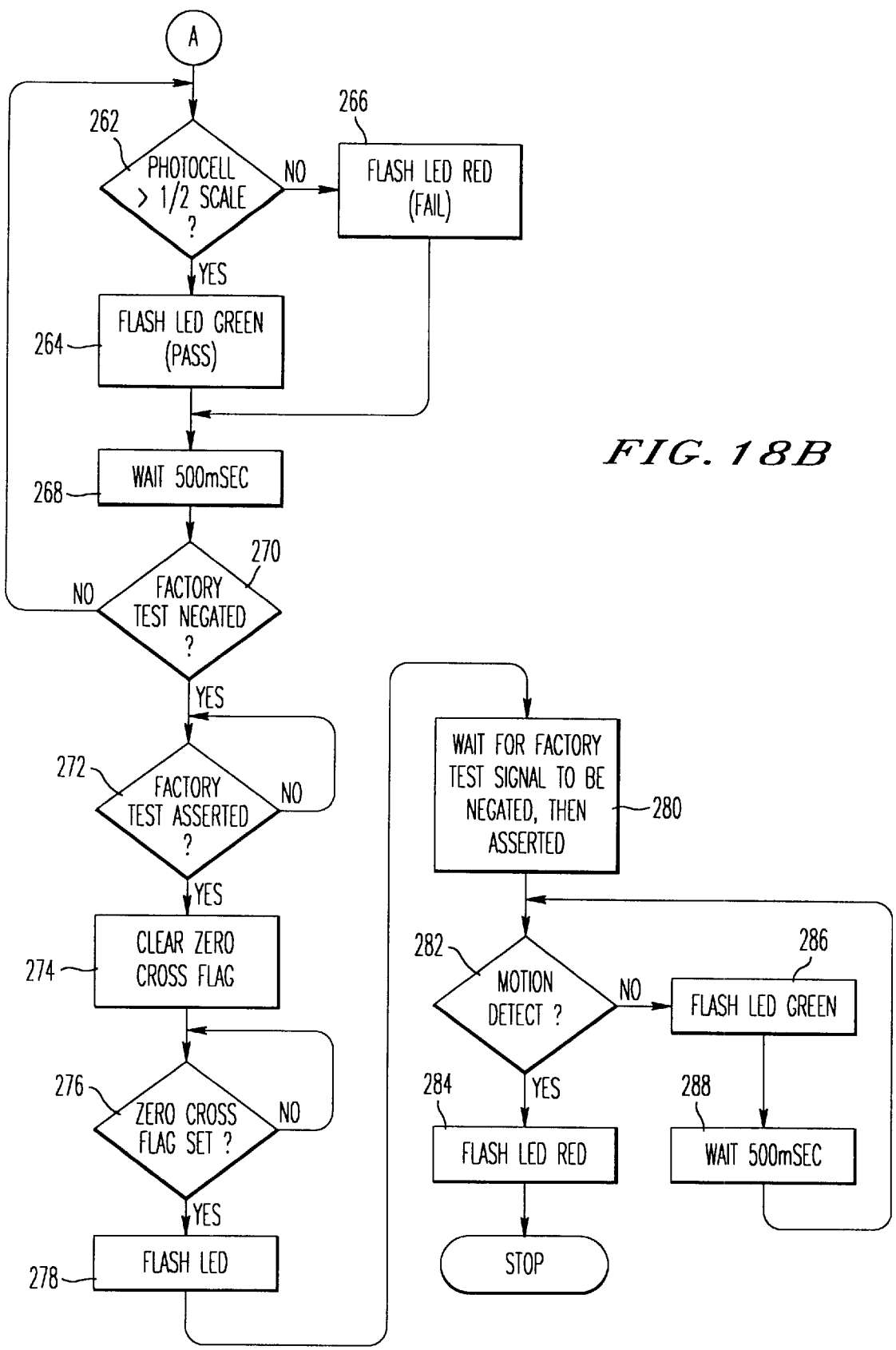
Figure 19:
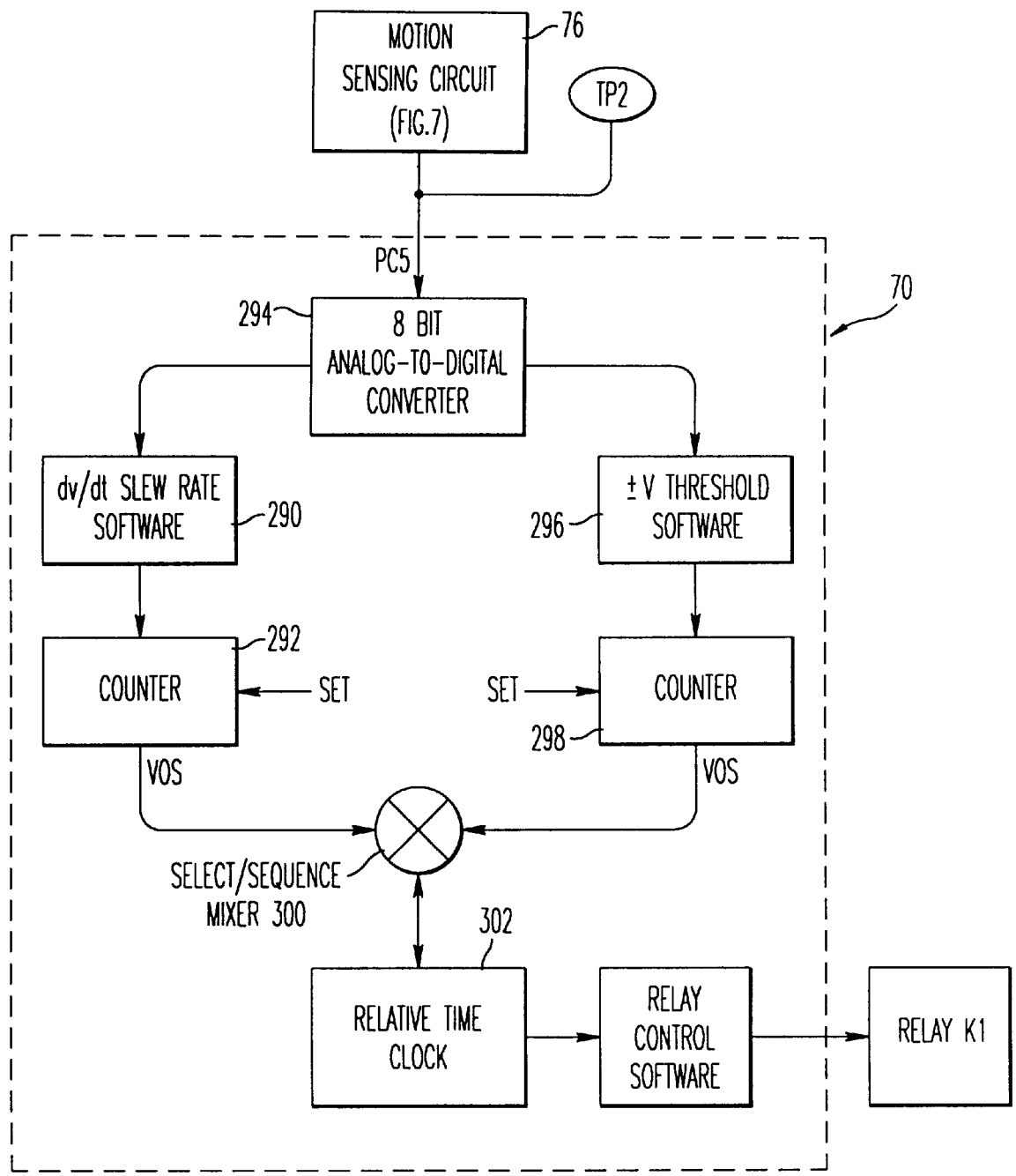
FIG. 19 is a schematic diagram of software and hardware signal processing components of the lighting control system for implementing tolerant and intolerant modes of operation in accordance with an embodiment of the present invention.

With reference to FIG. 18, the microprocessor is programmed during factory testing to flash the LEDs 84' and 84" to illuminate the light pipe to an amber color (block 220). The microprocessor proceeds to wait a period of time (e.g., 500 milliseconds) before performing a checksum operation on the microprocessor's ROM (block 222). The microprocessor checks the first byte from the EEPROM to see if a match exists with the revision number of the software in the ROM. The microprocessor reads in all of the EEPROM to the RAM and then performs a triple redundancy test of all three memory locations (i.e., the microprocessor ROM and RAM and the EEPROM 72). If two out of the three memory locations do not match after a total of three of attempts, the default values in the ROM are used. If the checksum reveals no problems with the ROM (block 224), the microprocessor flashes the green LED 84" (block 226) and waits a period of time (e.g., 500 milliseconds) before performing a RAM pattern test (block 228). If there is a problem with the ROM, the test engineer is notified by the LEDs being driven again to illuminate the light pipe an amber color. Similarly, if the RAM pattern test fails, the engineer is notified by the flashing amber light pipe (block 230). The microprocessor then generates a tone via the buzzer BZ1 after a successful RAM pattern test (block 232). Fail codes can be stored using a memory device (e.g., EEPROM 72 or the ROM on the microprocessor 70). An external emulator can therefore read from the memory device to determine where the system 10 failed.

With reference to block 234 of FIG. 18, the microprocessor drives the LEDs 84' and 84" in a sequential manner to indicate the firmware revision number (e.g., a number of red LED 84' flashes followed by a number of green LED 84" flashes which correspond to a binary revision number). After turning off the relay K1 (block 235), the microprocessor performs a test switch routine for each of the switches, that is the TO set switch SW5, the daylight set switch SW6, the slide switch SW1, and the MANUAL/AUTO and the FIXED/ADAPTIVE timing switches in the DIP switch SW2 (blocks 234, 236, 238, 240, 242 and 244, respectively). The test switch routine generally involves asserting the factory test, for example, using the switch SW3 or the pins or pads.

When the factory test switch (e.g., switch SW3) is toggled or depressed in the factory test mode, the microprocessor 70 single steps through the factory test routine stored within the ROM or the EEPROM 72. One or more tests can be performed for each button press or from an externally driven activatory or computer.

The microprocessor 70 can employ two-way communication for test equipment use, as well for interfacing addressable networks (e.g., Echelon® LONWORKS Technology™). In a network capable product, the power supply circuit board (FIG. 17) can be enhanced with a configurable transceiver on or off the board which allows interfacing to numerous system addressable, physical network types (e.g., twisted pair, radio frequency, link power, infrared transmission, power line communication, and so on). The transceiver is physically connected via an RJ-11 connector, terminal block or a similar type of connector. This allows access to the microprocessor 70 and the EEPROM 72, or the microprocessor ROM and RAM, for reporting purposes and for configuration of variables. For a test equipment interface, fail codes, process control and testing can be controlled from the microprocessor 70 or an external computer. The microprocessor can inhibit the factory test engineer from proceeding with testing if the system 10 fails a test. Physical interconnections are provided via test pads on the PCB 46 for test pin access (e.g., pogo pin). These physical interconnections allow testing to be conducted, diagnostic information to be read, configuration of system variables, interfacing with LONWORKS™ or other types of generic or specific LANs, network configuration of standard configuration parameter types (SCPT) and standard network variable types (SNVT). With this implementation, the system 10 can additionally control a lighting fixture dimming actuator, report occupancy status (e.g., security use), and provide feedback for building control equipment (e.g., HVAC).

With continued reference to FIG. 18, the relay K1 is placed in an initial state (i.e., open or OFF) by the microprocessor (block 246) and then closed (block 250). After the factory test is negated and then reasserted to test the relay (block 252), the relay is opened (block 254). The factory test is negated and then reasserted (block 256) before the photocell trimmer lines are adjusted for improved readings (block 258). The trimmer state is stored in the EEPROM 72 (block 260). If the photocell is greater than one-half its scale during its calibration test, the green LED 84" is flashed (passed) (block 264); otherwise, the red LED 84' is flashed (failed) (block 266). The microprocessor waits for a period of time to elapse (e.g., 500 milliseconds) (block 268) before determining if the photocell is greater than one-half its scale (blocks 270 and 262).

After the factory test is reasserted (block 272), the microprocessor clears the zero-cross flag (block 274). One of the LEDs is flashed after the zero-cross flag is set (blocks 276 and 278). The motion sensing circuit 76 is then tested after the factory test is reasserted (block 280) by using an external infrared heat source or the presence of a person (block 282). If motion is detected, the red LED 84' is flashed (block 284); otherwise, the green LED 84" is flashed (block 286). The microprocessor waits for a period of time to elapse (block 288) before determining if another output signal has been generated by the motion sensing circuit 76 in response to detected motion.

The microprocessor can be programmed to power up and power down lighting fixtures differently depending on the character of the zone in which the lighting control system is installed. For example, tolerant and intolerant zones can be defined whereby the microprocessor 70 is programmed to be more sensitive to detected motion in an intolerant zone than in a tolerant zone. This feature is particularly useful, for example, for an office that has a significant amount of employee activity during the daytime versus nighttime, or vice versa. In the case of a busy daytime office, the likelihood that detected motion at nighttime is that of an employee is small. The motion detected during this period is more likely an external noise source such as a walkie-talkie carried by a guard outside the zone. Thus, the microprocessor can be programmed to operate in a tolerant zone and require motion sensor output signals to be characterized by a greater magnitude, duration, or frequency or a different duty cycle, or a combination of these signal characteristics, before the lighting fixtures are powered up via the relay K1. A microprocessor operating in an intolerant zone, on the other hand, is programmed to respond to detected noise without excessive delay.

In addition to the previously described tolerant/intolerant zones, the following two processes can be employed. Acceptable slew rates, that is, analog signals at test point T2 (FIG. 7) representing change in voltage over time or dv/dt can be programmed and changed in the EEPROM 72 via slew rate software 290. At present, the minimum acceptable slew rate is greater than or equal to 5 volts per millisecond, and the maximum acceptable is 15 volts per millisecond. Slew rates less than 5 volts per millisecond or greater than 15 volts per millisecond are ignored. This creates a software bandpass filter. The numerical occurrences of these slew rates can be selectively counted by a counter 292. The output of the counter (e.g., 1 to X counts) becomes a valid occupant signal VOS. In addition, the counter provides added verification since it requires multiple dv/dt's (count>1) and therefore provides filtering to reduce false VOS due to outside noise mechanisms.

This software emulates a hardware variable reference window comparator. An analog-to-digital converter ADC 294 is calibrated to the ½ VCC quiescent operating point. With an 8-bit ADC, this is 80H (hexadecimal). Calibration is done by connecting TP1 to TP3 and storing the ADC's value as the V quiescent ($V_q$) operating point. This compensates for any DC offset associated with the second stage of the amplifier U1B (FIG. 7). A value can be set above and below the $V_q$ which defines the $V_{TH}$ trip point. For example, if 80H=$V_q$, 1 bit is approximately 20 m$V_q$. Thus, to select a ±500 mv $V_{TH}$, the ADC upper (+) operating point=9AH and the lower (−) operating point=66 H. Values between 9AH and 66H are ignored. The numerical occurrences of values outside this range can be selectively counted by the $V_{TH}$ software 296 and a counter 298, at which point the counter output (1 to X counts) becomes a valid occupant signal (VOS). The counter 298 provides added verification since it requires multiple $V_{TH}$'s, thus providing filtering to reduce false VOS due to outside noise mechanisms.

A sequence/select mixer 300 controls the type and sequence mix of dv/dt VOS and ±$V_{TH}$ VOS that optimize signal processing for a given application. For example, high noise environments may require a higher count of dv/dt's to produce a VOS than an environment which requires a fast response and high sensitivity. In the latter case, the ±$V_{TH}$ VOS with counter=1 can be selected. Various combinations of required trip VOS to maintain VOS can be sequenced and mixed using the SSM 300.

SSM 300 operation can be varied based on the state of relative time clock (RTC), that is, by effectively choosing the optimum signal process based on the occupant's "signature" and time of day. Thus, adaptive sensitivity can be implemented. For example, during a tolerant time period, the $V_{TH}$ is increased, requiring a greater signal to raise the threshold level, along with a counter 298 value set to greater than 1. This would cause the system 10 to be less sensitive, e.g., need more motion to respond; however, once a VOS is passed, the sensitivity can be increased (e.g., count=1 and $V_{TH}$ decreased) to respond to less motion while the occupant is present with an RTC=daytime. If RTC=nighttime, sensitivity is not increased in this manner.

Figure 20:
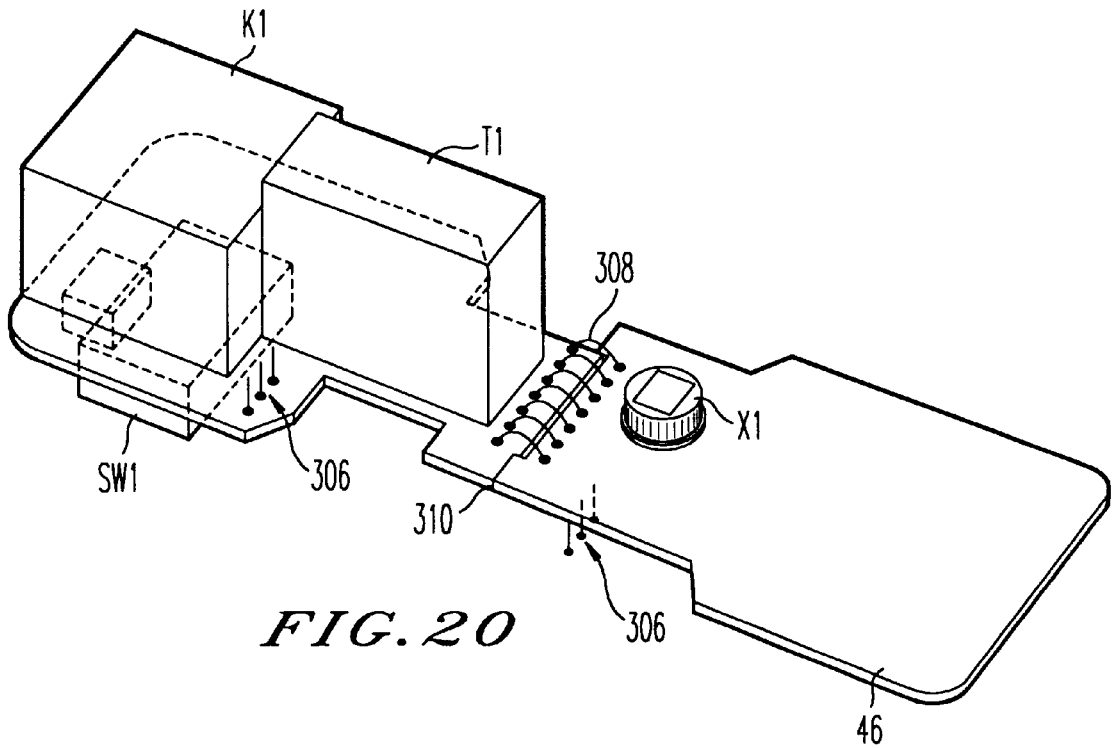
FIGS. 20 and 21 are perspective views of a printed circuit board on which the lighting control system can e mounted which is constructed in accordance with an embodiment of the present invention.
Figure 21:
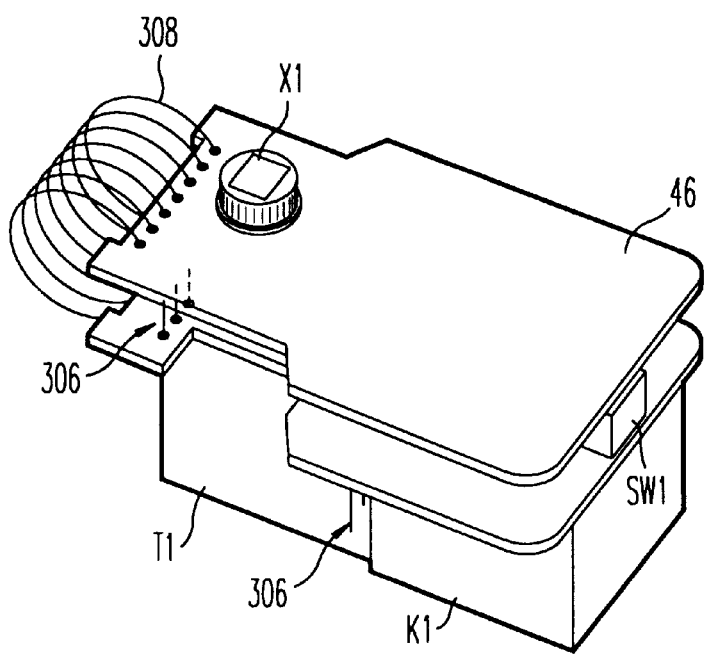

An exemplary PCB 46 is depicted in FIGS. 20 and 21 which can be used within the housing 24 (FIG. 2). The PCB comprises the components depicted in FIG. 5, some of which are shown here, i.e., the relay K1, the transformer T1, the slide switch SW1 and the motion sensor X1 (FIG. 7). The PCB is preferably a perforated board with the two halves being electrically connected by a ribbon cable 308. Thus, the PCB in FIG. 20 can be inverted as shown in FIG. 21 to reduce its planar area for insertion into the housing 24. Test pins 306 are provided on both sides of the PCB and on either side of the perforation 310. The pins 306 allow a test engineer to access the system 10 components when, for example, the housing 24 is open (i.e., by removing the bracket) and is connected to a test fixture.

While certain advantageous embodiments have been chosen to illustrate the invention, it will be understood by those skilled in the art that various changes and modifications can be made herein without departing from the scope of the invention as defined in the appended claims.

What is claimed is:

1. A system for selectively providing power from a power source to at least one load to operate in an area for at least one occupant, comprising:

a relay configured to provide a current conduction path between said power source and said load when in a closed position, and to interrupt said path when in an open position;

a processing device connected to said relay for controlling when said relay is in said open position and when said relay is in said closed position;

a memory device associated with said processing device for storing program code and at least one parameter, said processing device being programmable to control said relay switch in accordance with said stored program code and said parameter; and a sensor connected to said processing device for detecting when an occupant has entered said area for providing at least one output signal to said processing device;

wherein said processing device is programmable to close said relay in response to said output signal for a period of time, the duration of said period of time being dynamically variable and determined automatically by said processing device in accordance with how often said sensor detects said at least one occupant in said area using at least one number, said number being stored in said memory device and determined by said processing device to be the duration of time elapsing between one of initialization of said system and a first occurrence of said sensor detecting said at least one occupant, and a subsequent occurrence of said sensor detecting said at least one occupant in said area.

2. A system as claimed in claim 1, further comprising a switch connected to said processing device to select one of a plurality of operational modes comprising a fixed timing mode and an adaptive timing mode, said fixed timing mode corresponding to a mode wherein said relay is held in said closed position for a second period of time that is not automatically adjustable by said processing device.

3. A system as claimed in claim 1, further comprising a first switch connected to said processing device which, when activated, causes the processing device to close said relay, and a second switch connected to said processing device to select one of a plurality of operational modes comprising a manual mode and an automatic mode, said manual mode corresponding to a mode in which said processing device requires actuation of said first switch before said processing device causes said relay to close and energize said load, said automatic mode corresponding to a mode in which said processing device closes said relay in response to said output signal and without requiring actuation of said first switch.

4. A system as claimed in claim 1, further comprising a buzzer connected to said processing device, said processing device being programmable to cause said buzzer to generate a tone at a predetermined time before said relay switch is programmed to be changed from said closed position to said open position, and to automatically increase said period of time upon receipt of another output signal from said sensor.

5. A system as claimed in claim 1, further comprising a photocell sensor for measuring an ambient light level in said area, said processing device being programmable to inhibit closing said relay upon receiving said output signal when said measured ambient light level exceeds a predetermined level stored in said memory device.

6. A system as claimed in claim 1, wherein said load is a lighting fixture.

7. A system for selectively providing power from a power source to at least one load to operate in an area for at least one occupant, comprising:

a relay configured to provide a current conduction path between said power source and said load when in a closed position, and to interrupt said path when in an open position;

a processing device connected to said relay for controlling when said relay is in said open position and when said relay is in said closed position;

a memory device associated with said processing device for storing program code and at least one parameter specified by a system user, said processing device being programmable to control said relay switch in accordance with said stored program code and said parameter; and a sensor connected to said processing device for detecting when an occupant has entered said area and for providing at least one output signal to said processing device;

wherein said processing device is programmable to close said relay in response to said output signal for a period of time not less than a first period of time equivalent to said parameter and not more than a second period of time, the duration of said second period of time being dynamically variable and determined automatically by said processing device in accordance with how often said sensor detects said at least one occupant in said area using at least one number, said number being stored in said memory device and determined by said processing device to be the duration of time elapsing between the occurrence of said sensor detecting said at least one occupant in said area, and one of initialization of said system and a prior occurrence of said sensor detecting said at least one occupant in said area.

8. A system for selectively providing power from a power source to a load to operate in an area for at least one occupant, comprising:

a relay configured to provide a current conduction path between said power source and said load when in a closed position, and to interrupt said path when in an open position;

a processing device connected to said relay for controlling when said relay is in an open position and when said relay is in a closed position;

a sensor connected to said processing device for detecting when said occupant has entered said area and for providing at least one output signal to said processing device;

a memory device associated with said processing device for storing program code and at least one parameter specified by a system user, said processing device being programmable to control said relay in accordance with said stored program code, said at least one parameter and said at least one output signal to close in response to said at least one output signal for a dynamically variable period of time determined automatically by said processing device in accordance with how often said sensor detects said occupant in said area using at least one number, said number being stored in said memory device and determined by said processing device to be the duration of time elapsing between the occurrence of said sensor detecting said at least one occupant in said area, and one of initialization of said system and a prior occurrence of said sensor detecting said at least one occupant in said area;

a first switch connected to said processing device to select one of a plurality of operational modes comprising a manual mode and an automatic mode; and a second switch connected to said processing means for controlling when said processing device closes said relay depending on which of said plurality of operational modes is selected said automatic mode corresponding to a mode in which said processing device closes said relay in response to said output signal, said manual mode corresponding to a mode in which said processing device controls said relay, when open, to remain open until said second switch is activated regardless of said output signal.

9. A system as claimed in claim 8, further comprising a tone generator connected to said processing device, said processing device being programmable to close said relay for a first period of time before opening said relay, to generate a tone via said tone generator a predetermined amount of time before said first period of time elapses, and to continue to maintain said relay in said closed position after said first period of time elapses upon detection of motion by said sensor, when operating in said automatic mode.

10. A system as claimed in claim 8, further comprising a tone generator connected to said processing device, said processing device being programmable to close said relay for a first period of time before opening said relay, to generate a tone via said tone generator a predetermined amount of time before said first period of time elapses, and to open said relay after said first period of time elapses, and to close said relay again upon detection of motion by said sensor, when operating in said manual mode.

11. A system for selectively providing power from a power source to a load to operate in an area for at least one occupant, comprising:
    a relay configured to provide a current conduction path between said power source and said load when in a closed position, and to interrupt said path when in an open position;
    a processing device connected to said relay for controlling when said relay is in an open position and when said relay is in a closed position;
    a sensor connected to said processing device for detecting when said occupant has entered said area and for providing at least one output signal to said processing device;
    a memory device associated with said processing device for storing program code and at least one parameter, said processing device being operable to control said relay in accordance with said stored program code, said at least one parameter and said at least one output signal to close in response to said at least one output signal for a dynamically variable period of time determined automatically by said processing device in accordance with how often said sensor detects said occupant in said area using at least one number, said number being stored in said memory device and determined by said processing device to be the duration of time elapsing between the occurrence of said sensor detecting said at least one occupant in said area, and one of initialization of said system and a prior occurrence of said sensor detecting said at least one occupant in said area;
    an air-gap switch; and
    a power supply circuit for providing power signals from said power source to said relay, said processing device, said sensor and said memory device and comprising a transformer, said air-gap switch being connected between said power source and said transformer.

* * * * *